US012804377B2

(12) United States Patent
Li et al.

(10) Patent No.: US 12,804,377 B2
(45) Date of Patent: Nov. 17, 2026

(54) DYNAMIC MANAGEMENT OF A PROVISIONING ESIM FOR A WIRELESS DEVICE

(71) Applicant: Apple Inc., Cupertino, CA (US)

(72) Inventors: Li Li, Los Altos, CA (US); Abishek Kumar Vaidyanathan, Union City, CA (US); Kanuganti Rajeswar Reddy, Sunnyvale, CA (US); Keizo Marui, New Dundee (CA); Mohanasundaram Kattavoor Sivakumar, Mountain View, CA (US); Rohan Wadageri, Bangalore (IN); Zexing Shi, San Jose, CA (US); Raj S. Chaugule, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 18/449,667

(22) Filed: Aug. 14, 2023

(65) Prior Publication Data

US 2024/0080654 A1 Mar. 7, 2024

Related U.S. Application Data

(60) Provisional application No. 63/374,727, filed on Sep. 6, 2022.

(51) Int. Cl.
*H04W 8/16* (2009.01)
*H04W 8/22* (2009.01)

(52) U.S. Cl.
CPC ............... *H04W 8/16* (2013.01); *H04W 8/22* (2013.01)

(58) Field of Classification Search
CPC .................................. H04W 8/16; H04W 8/22
See application file for complete search history.

(56) References Cited

U.S. PATENT DOCUMENTS

| | | | |
|---|---|---|---|
| 12,081,969 B2 * | 9/2024 | Sureshlal ............ | H04W 12/069 |
| 2001/0005859 A1 | 6/2001 | Okuyama et al. | |
| 2011/0289172 A1 | 11/2011 | Marcellino | |
| 2013/0329550 A1 | 12/2013 | Kotecha et al. | |

(Continued)

FOREIGN PATENT DOCUMENTS

| | | |
|---|---|---|
| CN | 109089256 A | 12/2018 |
| EP | 2773077 A1 | 9/2014 |
| EP | 3537685 A1 | 9/2019 |

OTHER PUBLICATIONS

PCT Patent Application No. PCT/US2023/030263—International Search Report and Written Opinion dated Jan. 11, 2024.

(Continued)

*Primary Examiner* — Congvan Tran
(74) *Attorney, Agent, or Firm* — DICKINSON WRIGHT RLLP

(57) ABSTRACT

This application sets forth techniques for dynamically managing a provisioning electronic subscriber identity module (eSIM) for a wireless device. A provisioning eSIM is installed in the wireless device to provide a limited functionality connectivity option for essential services, such as device activation and user eSIM provisioning. To reduce signaling load on a network and to conserve wireless device battery power, the provisioning eSIM is reconfigured between an inactive state and an active state dynamically based on user actions and system requirements.

20 Claims, 16 Drawing Sheets

(56) References Cited

U.S. PATENT DOCUMENTS

| | | | | |
|---|---|---|---|---|
| 2016/0246611 | A1 | 8/2016 | Li et al. | |
| 2016/0316356 | A1 | 10/2016 | Li et al. | |
| 2018/0351945 | A1* | 12/2018 | Li | H04W 8/205 |
| 2020/0050439 | A1 | 2/2020 | Bjørdal et al. | |
| 2020/0220983 | A1 | 7/2020 | Hu et al. | |
| 2020/0221294 | A1* | 7/2020 | Kang | H04W 12/35 |
| 2020/0267533 | A1* | 8/2020 | Zhang | H04W 4/80 |
| 2021/0360723 | A1* | 11/2021 | Takakura | H04W 48/18 |
| 2021/0410038 | A1 | 12/2021 | Bjørdal et al. | |
| 2022/0038887 | A1 | 2/2022 | Chaugule et al. | |
| 2022/0095180 | A1* | 3/2022 | Sabapathi | H04W 36/0088 |
| 2022/0104005 | A1 | 3/2022 | Xiong et al. | |
| 2022/0264683 | A1* | 8/2022 | Liu | H04W 28/02 |
| 2022/0295343 | A1* | 9/2022 | Pefkianakis | H04W 24/08 |
| 2022/0322083 | A1* | 10/2022 | Kreishan | H04W 12/0431 |
| 2022/0330007 | A1* | 10/2022 | Li | H04W 8/183 |
| 2022/0369094 | A1 | 11/2022 | Rajwar et al. | |
| 2022/0386105 | A1 | 12/2022 | Jung et al. | |
| 2023/0121282 | A1 | 4/2023 | Cunliffe | |
| 2023/0171586 | A1* | 6/2023 | Holmes | H04W 84/18 455/435.1 |
| 2023/0247436 | A1 | 8/2023 | Boettger | |

OTHER PUBLICATIONS

International Patent Application No. PCT/US2025/010420—International Search Report and Written Opinion dated Apr. 2, 2025.

International Patent Application No. PCT/US2025/010570—International Search Report and Written Opinion dated Apr. 1, 2025.

Taiwan Patent Application No. 114103447—First Office Action dated Sep. 22, 2025.

U.S. Appl. No. 18/909,672, Non-Final Office Action dated Sep. 1, 2026.

* cited by examiner

DYNAMIC MANAGEMENT OF A PROVISIONING ESIM FOR A WIRELESS DEVICE

CROSS-REFERENCE TO RELATED APPLICATIONS

The present application claims the benefit of U.S. Provisional Application No. 63/374,727, entitled "DYNAMIC MANAGEMENT OF A PROVISIONING ESIM FOR A WIRELESS DEVICE," filed Sep. 6, 2022, the content of which is incorporated by reference herein in its entirety for all purposes.

FIELD

The described embodiments set forth techniques for dynamically managing a provisioning electronic subscriber identity module (eSIM) for a wireless device. A provisioning eSIM is installed in the wireless device to provide a limited functionality connectivity option for essential services, such as device activation and user eSIM provisioning. To reduce signaling load on a network and to conserve wireless device battery power, the provisioning eSIM is reconfigured between an inactive state and an active state dynamically based on user actions and system requirements.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

A wireless device can include a provisioning eSIM, also referred to as a bootstrap eSIM, installed at a time of manufacture or dynamically to the wireless device thereafter. The provisioning eSIM provides a limited functionality connectivity option to allow the wireless device to connect to a cellular wireless network for essential services, such as for device activation, user eSIM installation, or the like. Presently, the provisioning eSIM can initiate network searching and network attachment when the wireless device is booted up to provide ready connectivity when required. In some circumstances, such during a new product launch, a high number of wireless devices can connect to the cellular wireless network simultaneously challenging a mobile network operator (MNO) infrastructure due to a high signaling load. There exists a need for mechanisms to manage dynamically modes/states of a provisioning eSIM to restrict use to essential activities and offload active connections to reduce network signaling loading.

SUMMARY

This application sets forth techniques for dynamically managing a provisioning electronic subscriber identity module (eSIM) for a wireless device. A provisioning eSIM is installed in the wireless device to provide a limited functionality connectivity option for essential services, such as device activation and user eSIM provisioning. To reduce signaling load on a network and to conserve wireless device battery power, the provisioning eSIM is reconfigured between an inactive state and an active state dynamically based on user actions and system requirements.

A wireless device includes a provisioning eSIM, also referred to as a bootstrap eSIM, installed at a time of manufacture or dynamically to the wireless device thereafter. The provisioning eSIM provides a limited functionality connectivity option to allow the wireless device to connect to a cellular wireless network for essential services, such as to connect to original equipment manufacturer (OEM) servers for device activation, to connect to mobile network operator (MNO) servers to provision, download and install a full functionality user eSIM, or the like. To reduce signaling loading on a cellular wireless network used by the provisioning eSIM and to conserve battery power, the wireless device configures the provisioning eSIM to enter an inactive state initially after enablement, where the inactive state restricts the wireless device from establishing a connection with the cellular wireless network. The inactive state can include a cellular airplane mode in which baseband cellular wireless transceiver functions are disable or a limited network search mode in which a baseband cellular wireless receiver function listens for signals from cellular wireless networks to ready the wireless device for future cellular wireless connections but does not transmit or connect to the cellular wireless network using the provisioning eSIM in the inactive state. The wireless device reconfigures the provisioning eSIM from the inactive state to an active state in response to a user action or system requirement to establish a cellular wireless network connection. Client services of the wireless device that require a provisioning eSIM cellular wireless connection can indicate a requirement to use the provisioning eSIM and release the provisioning eSIM when no longer required. The wireless device waits for a back-off time period managed by a back-off timer, after a current network use of the provisioning eSIM is met, to allow for re-use of the provisioning eSIM cellular wireless network attachment for a subsequent network use if required. The wireless device reconfigures the provisioning eSIM from the active state to the inactive state after expiration of the back-off timer to reduce signaling load on the cellular wireless network associated with the provisioning eSIM and to conserve battery power of the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
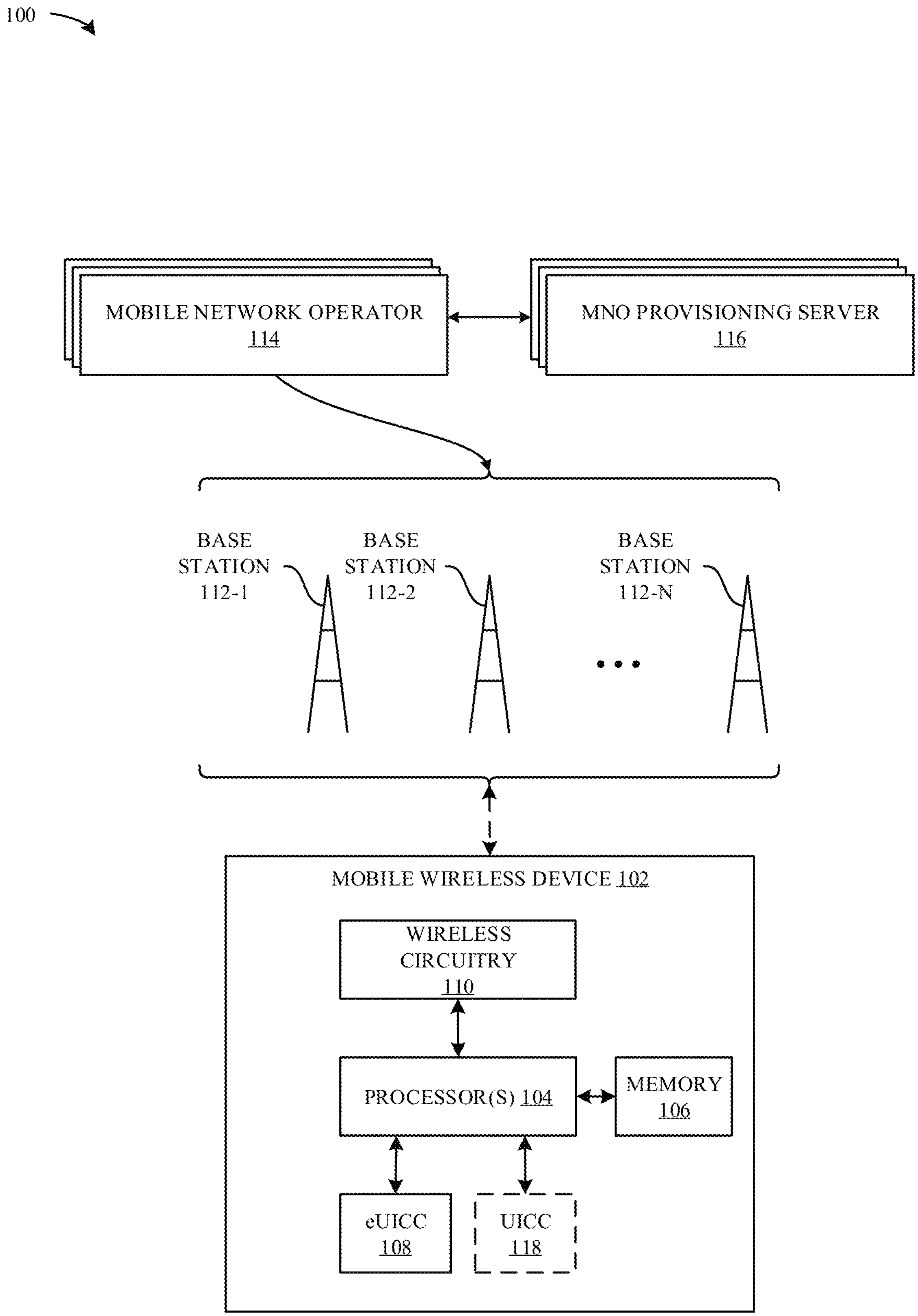
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for dynamically managing a provisioning electronic subscriber identity module (eSIM) for a wireless device. A provisioning eSIM is installed in the wireless device to provide a limited functionality connectivity option for essential services, such as device activation and user eSIM provisioning. To reduce signaling load on a network and to conserve wireless device battery power, the provisioning eSIM is reconfigured between an inactive state and an active state dynamically based on user actions and system requirements.

A wireless device includes a provisioning eSIM, also referred to as a bootstrap eSIM, installed at a time of manufacture or dynamically to the wireless device thereafter. The provisioning eSIM provides a limited functionality connectivity option to allow the wireless device to connect to a cellular wireless network for essential services, such as to connect to original equipment manufacturer (OEM) servers for device activation, to connect to mobile network operator (MNO) servers to provision, download and install a full functionality user eSIM, or the like. The provisioning eSIM can be used to establish a cellular wireless network connection when a non-cellular wireless connection or a user eSIM cellular wireless connection is not available or able to be established. In some cases, the provisioning eSIM can be restricted to limited-use data connections and to not allow for voice connections. In some cases, the provisioning eSIM can be restricted to connect to certain network endpoints to allow for certain management operations, such as for device initialization, cellular wireless service subscription, and user eSIM downloading. Presently, the provisioning eSIM is enabled and configured to an active state to initiate network searching and attach to a cellular wireless network associated with the provisioning eSIM to be ready for use when required. This immediate attachment, however, can challenge a cellular wireless network loading due to a large number of wireless devices connecting to the cellular wireless network at the same time. The cellular wireless network associated with the provisioning eSIM can be different from a cellular wireless network associated with a user eSIM subsequently downloaded and used for regular cellular wireless service. The bootstrap eSIM can be used as a default connectivity option when other wireless connections are not available.

To reduce signaling loading on a cellular wireless network used by the provisioning eSIM and to conserve battery power, as described further herein, the wireless device configures the provisioning eSIM to enter an inactive state initially after enablement, where the inactive state restricts the wireless device from establishing a connection with a cellular wireless network. The inactive state can include i) a cellular airplane mode in which a baseband cellular wireless transceiver is disabled (no cellular wireless transmissions or reception allowed) or ii) a limited network search mode in which a baseband cellular wireless receiver listens for signals from cellular wireless networks to ready the wireless device for future cellular wireless connections but does not transmit or connect to the cellular wireless network using the provisioning eSIM while in the inactive state. The wireless device reconfigures the provisioning eSIM from the inactive state to an active state in response to a user action or system requirement to establish a cellular wireless network connection. Client services of the wireless device that require a provisioning eSIM cellular wireless connection can indicate a requirement to use the provisioning eSIM, e.g., an application or system resource executing on an applications processor can assert a requirement for a provisioning eSIM connection. The application or system resource can hold the assertion until the cellular wireless network connection requirement has been completed and then release the provisioning eSIM assertion when no longer required. The wireless device waits for a back-off time period managed by a back-off timer, after a current network use of the provisioning eSIM is met. The back-off time period allows for re-using the existing provisioning eSIM cellular wireless network attachment for a subsequent network use if required and avoids ping-ponging the provisioning eSIM between the inactive state and the active state for a series of separate network uses. After expiration of the back-off timer, the wireless device reconfigures the provisioning eSIM from the active state to the inactive state to reduce signaling load on the cellular wireless network associated with the provisioning eSIM and to conserve battery power of the wireless device.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-*n* can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated provisioning servers 116 as part of a device initialization of the mobile wireless device 102, such as when purchasing a new mobile wireless device 102. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

The mobile wireless device 102, upon initial acquisition by a user, can lack an activated fully functional cellular wireless eSIM on the eUICC 108 and can also not include a UICC 118 with an activated physical SIM (pSIM) installed in the mobile wireless device 102. The user of the mobile wireless device 102 can be required to download a fully functional eSIM from an MNO provisioning server 116 to access cellular wireless services of a particular MNO with which the user establishes a cellular wireless subscription. After bootup, the mobile wireless device 102 can enable a limited functionality provisioning eSIM and configure the provisioning eSIM in an inactive state. When a user action or system resource indicates a wireless network connection via the provisioning eSIM is required, and no non-cellular wireless network connection or cellular wireless connection using a user eSIM is available or able to be established, the mobile wireless device 102 re-configures the provisioning eSIM from the inactive state to an active state to allow for establishing connections to a cellular wireless network associated with the provisioning eSIM.

Figure 2:
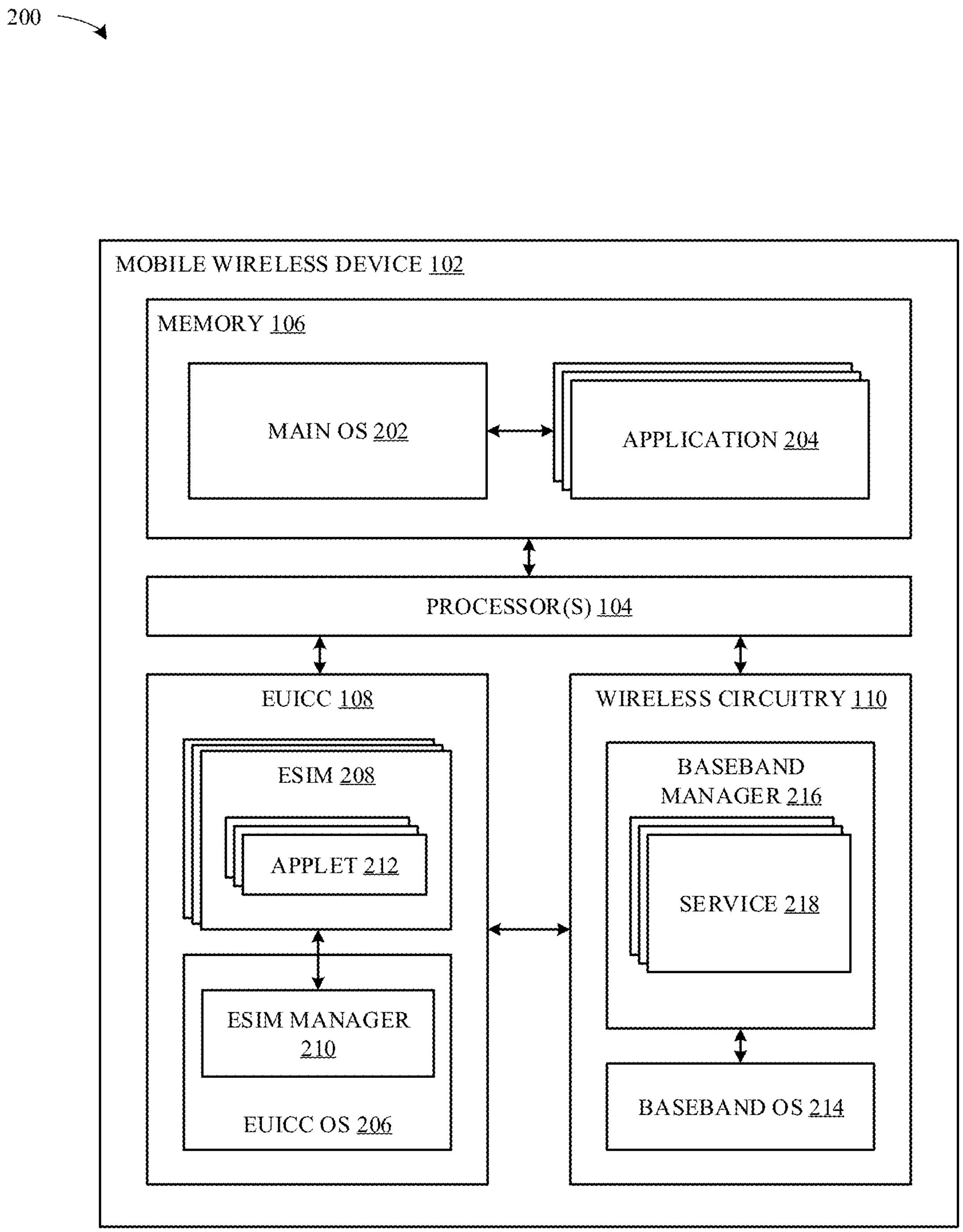
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108. For a provisioning eSIM 208 that provides limited functionality restricted to certain data connections when cellular wireless connections via user eSIMs 208 or a non-cellular wireless connection is unavailable, the mobile wireless device 102 enables the provisioning eSIM 208 but also places the provisioning eSIM in an inactive state to ready for use but unable to establish connections with a cellular wireless network until reconfigured to an active state, e.g., in response to a user action or a system resource requirement.

Figure 3:
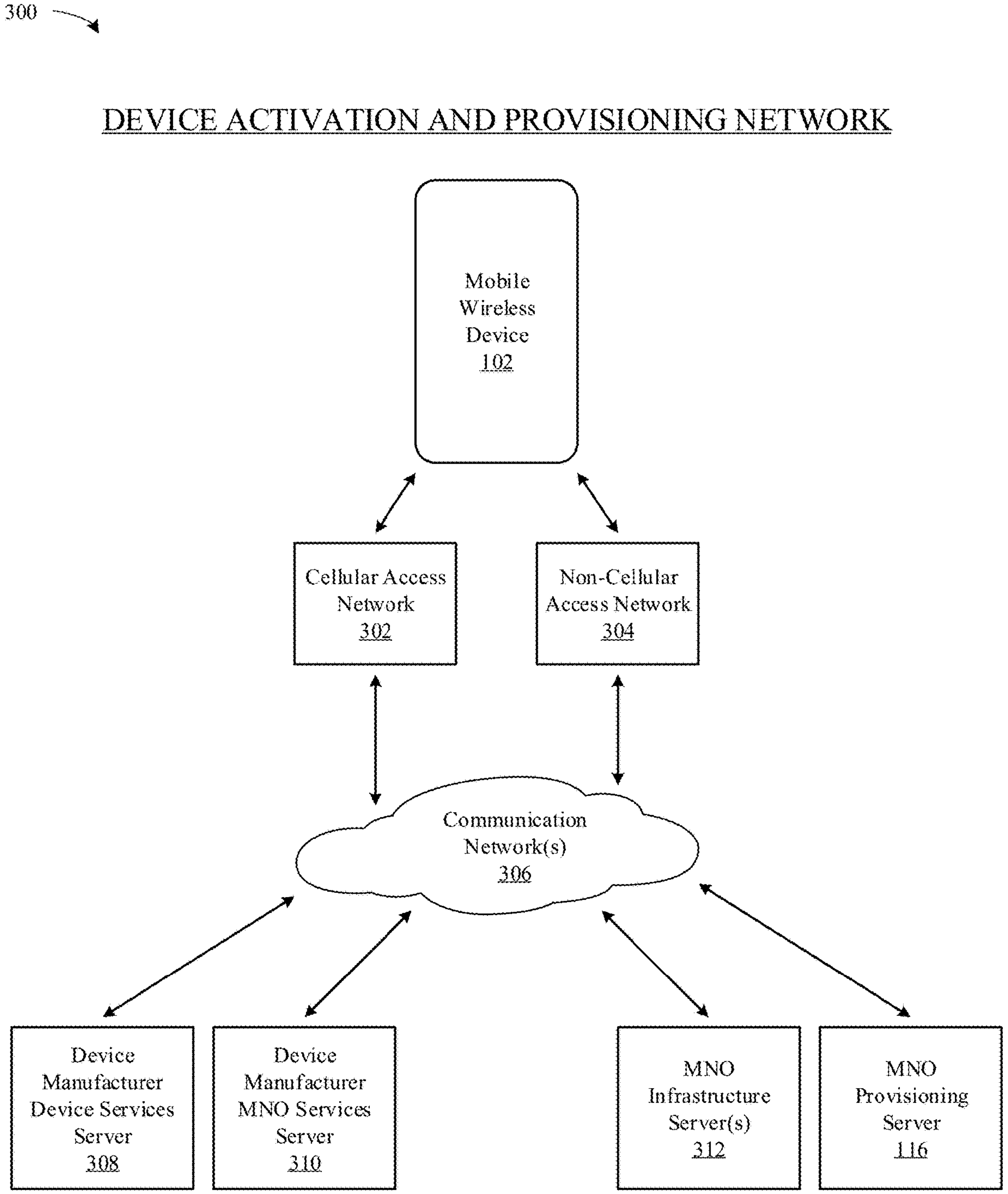
FIG. 3 illustrates an exemplary device activation and provisioning network for a mobile wireless device, according to some embodiments.

FIG. 3 illustrates a diagram 300 of elements of communication network involved in device activation and SIM provisioning, installation, and activation for a mobile wireless device 102. Data connectivity for the mobile wireless device 102 can be required for device activation and SIM provisioning. In some scenarios, a non-cellular access network 304 can be available for the mobile wireless device 102 to connect to various device manufacturer managed and/or MNO 114 managed servers via intervening communication networks 306. In some scenarios, a non-cellular access network 304 may be not available, and the mobile wireless device 102 may rely on access to a cellular access network 302 for activation of the mobile wireless device 102 and for SIM provisioning, e.g., downloading and installation of an eSIM 208, to the mobile wireless device 102. In some embodiments, the mobile wireless device 102 includes a limited functionality SIM profile (e.g., a pre-installed limited functionality bootstrap eSIM or a pre-installed limited functionality pSIM) that can provide limited access to the cellular access network 302 for provisioning an eSIM 208, e.g., when access to a non-cellular access network 304 that can interconnect to the required servers is not available. An OEM manufacturer of the mobile wireless device 102 can maintain multiple network-based servers to assist with management of the mobile wireless device 102, e.g., a device manufacturer managed device services server 308, which can provide management for device manufacturer supplied services to the mobile wireless device 102, and a device manufacturer managed MNO services server 310, which can provide a device manufacturer anchor for management of MNO supplied services to the mobile wireless device 102. An MNO 114 can also provide their own set of servers, including various MNO infrastructure servers 312 for managing cellular access, authentication, authorization, subscription, billing, and other associated management functions for cellular wireless services for the mobile wireless device 102, and MNO provisioning servers 116 from which SIM firmware, e.g., eSIMs 208, OTA updates for eSIMs 208 or pSIMs, etc., can be accessed, with appropriate authentication, by the mobile wireless device 102.

Figure 4A:
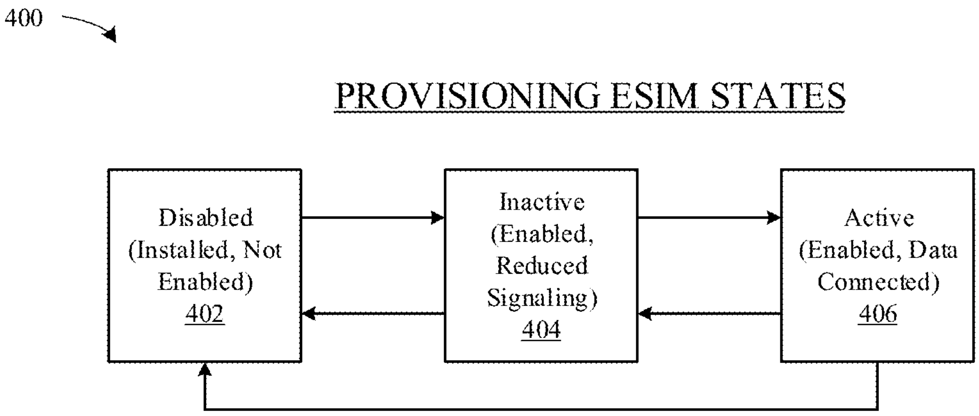
FIG. 4A illustrates an exemplary state diagram for a provisioning eSIM, according to some embodiments.

FIG. 4A illustrates a diagram 400 of exemplary states for a provisioning eSIM 208 for a mobile wireless device 102. The provisioning eSIM 208 can be installed in the mobile wireless device 102 at a manufacturing facility or downloaded to the mobile wireless device 102 after manufacture. The provisioning eSIM 208 can be installed on an eUICC 108 of the mobile wireless device 102 can be configured in a disabled state 402. The provisioning eSIM 208 cannot be used until being enabled. The provisioning eSIM 208 can be reconfigured from the disabled state 402 to an inactive state 404 in which cellular wireless capabilities using the provisioning eSIM 208 can be restricted from establishing a connection with a cellular wireless network, e.g., to reduce signaling loads on the cellular wireless network associated with the provisioning eSIM 208 and to conserve battery power of the mobile wireless device 102. The inactive state 404 for the provisioning eSIM 208 can also be referred to as a signaling reduction mode/state. The inactive state can include i) a cellular airplane mode in which a baseband cellular wireless transceiver is disabled (no cellular wireless transmissions or reception allowed) or ii) a limited network search mode in which a baseband cellular wireless receiver listens for signals from cellular wireless networks to ready the wireless device for future cellular wireless connections but does not transmit or connect to the cellular wireless network using the provisioning eSIM while in the inactive state. The provisioning eSIM 208 can be enabled while in the inactive state 404 but can be incapable of establishing a cellular wireless connection with a cellular wireless network associated with the provisioning eSIM 208 while in the inactive state 404. The provisioning eSIM 208 can be reconfigured from the inactive state 404 to an active state 406 in which a data connection can be established with a cellular wireless network associated with the provisioning eSIM 208. The mobile wireless device 102 can cause the provisioning eSIM 208 to enter and to exit the inactive state 404 on-demand, e.g., in response to a user action or a system resource requirement that indicates a cellular wireless connection is required, e.g., to allow for an Internet connection to a device manufacturer managed server for device activation, to enable a secure connection to an MNO 114 provisioning server 116 to download a user eSIM 208, to communicate status of various eSIM provisioning operations to a device manufacturer server or to an MNO server, or the like. Client services of the wireless device that require a provisioning eSIM cellular wireless connection can indicate a requirement to use the provisioning eSIM, e.g., an application or system resource executing on an applications processor can assert a requirement for a provisioning eSIM connection. The application or system resource can hold the assertion until the cellular wireless network connection requirement has been completed and then release the provisioning eSIM assertion when no longer required. The wireless device waits for the back-off time period managed by a back-off timer, after a current network use of the provisioning eSIM is met. The back-off time period allows for re-using the existing provisioning eSIM cellular wireless network attachment for a subsequent network use if required and avoids ping-ponging the provisioning eSIM between the inactive state and the active state for a series of separate network uses. The mobile wireless device 102 can also transition the provisioning eSIM 208 from the active state 406 directly to the disabled state 402, in some circumstances, such as after successful installation and enablement of a fully functional user eSIM 208 that provides access to cellular wireless network connectivity.

Figure 4B:
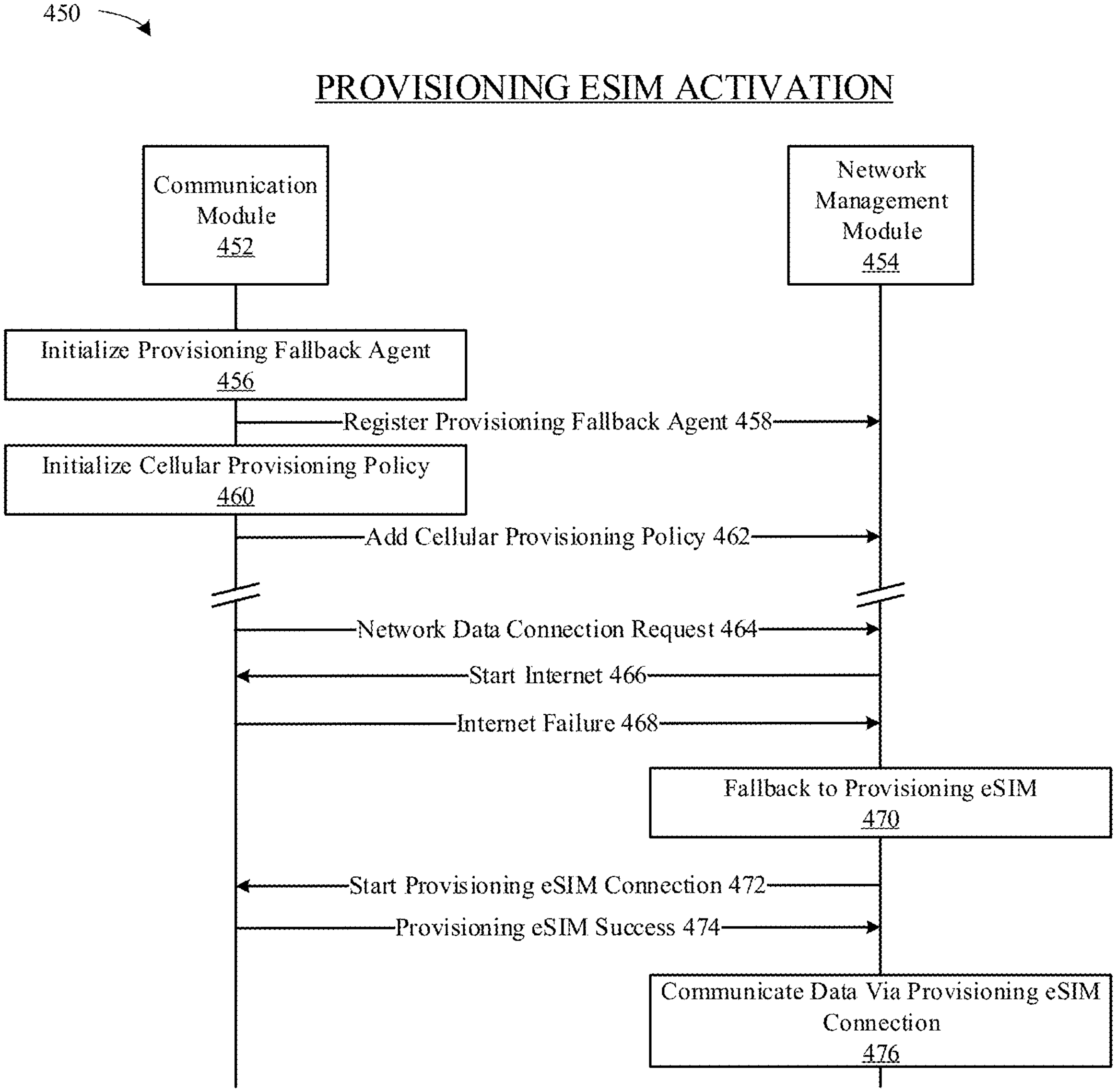
FIG. 4B illustrates an exemplary activation flow for a provisioning eSIM, according to some embodiments.

FIG. 4B illustrates a diagram 450 of an exemplary activation flow for a provisioning eSIM 208 installed on an eUICC 108 of a mobile wireless device 102. A communication module 452, which can execute on a processor 104 of the mobile wireless device 102, such as an applications processor or a baseband processor, at 456, can initialize a provisioning fallback agent associated with a provisioning eSIM 208. At 458, the communication module 452 can register the provisioning fallback agent with a network management module 454, which can also execute on the same processor 104 or another processor 104 of the mobile wireless device 102. At 460, the communication module 452 can initialize a cellular provisioning policy to indicate proper use of the provisioning eSIM 208 via the provisioning fallback agent. At 462, the communication module 452 can communicate the cellular provisioning policy to the network management module. Subsequently, at 464, the communication module 452 can determine a requirement for a network data connection, e.g., based on a user input action or on a system resource requirement, and can communicate a network data connection request to the network management module 454. In some embodiments, the network management module 454, can be unaware of the inactive state 404 for the provisioning eSIM 208. At 466, the network management module 454 can send a request to the communication module 452 to initiate an Internet data connection, e.g., by establishing a non-cellular wireless connection or a cellular wireless connection based on a user eSIM 208. At 452, the communication module 452 can respond to the network management module 454 indicating failure to establish the requested Internet data connection, which can occur when no non-cellular wireless connection can be established and no user eSIMs 208 are installed and enabled on the eUICC 108 of the mobile wireless device 102. At 470, the network management module 454 can fallback to use of the provisioning eSIM 208, e.g., in accordance with the cellular provisioning policy received previously from the communication module 452 at 462. At 472, the network management module 454 can send a message to the communication module 452 to establish a network connection using the provisioning eSIM 208. At 474, the communication module 452 can respond with an indication of successful establishing of a network connection using the provisioning eSIM 208. At 476, the network management module 454 can communicate data via the connection established using the provisioning eSIM 208. In some embodiments, as illustrated in FIG. 4B, a provisioning eSIM 208 capability is available for a data connection when no other data connection is available and used as a fallback connection on-demand.

Figure 5:
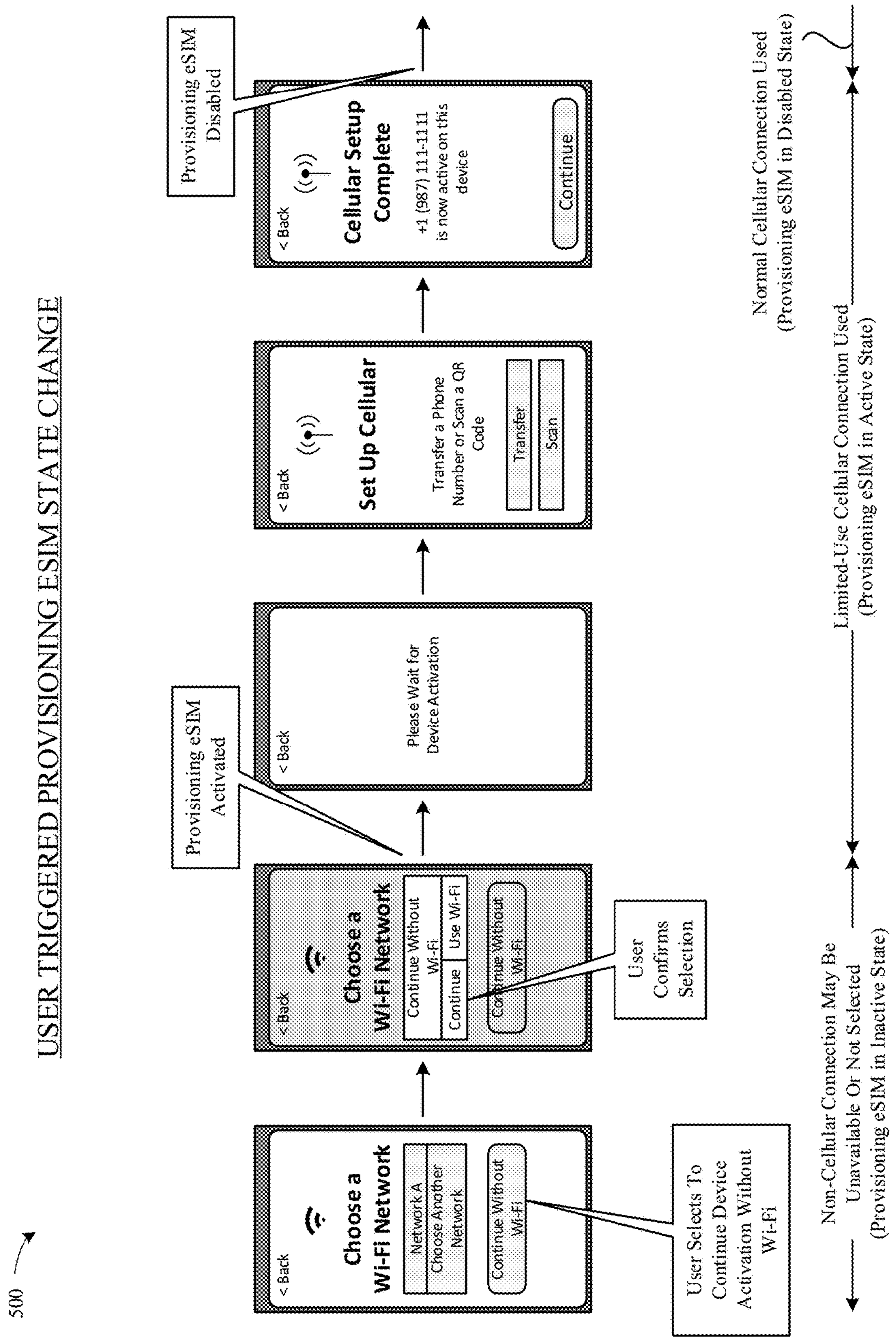
FIG. 5 illustrates an example of a state change for a provisioning eSIM triggered by user actions, according to some embodiments.

FIG. 5 illustrates a diagram 500 of an example of a state change for a provisioning eSIM 208 triggered by user actions at a mobile wireless device 102. The example of FIG. 5 illustrates a user-triggered state change for the provisioning eSIM 208 during an initialization procedure for the mobile wireless device 102, which can occur upon initial power-up or after a factory reset of the mobile wireless device 102. As part of the initialization procedure, the mobile wireless device 102 can require a data connection to communicate with one or more network-based servers of a device manufacturer during device activation or with one or more network-based servers of an MNO 114 to manage cellular wireless service. Initially, a user interface (UI) screen is presented to request selection of a non-cellular wireless network (e.g., a Wi-Fi network) with which to establish a data connection. The user of the mobile wireless device 102 can select an option to continue with the device activation procedure without connecting to a Wi-Fi network, and the user can be required to confirm selection of proceeding without establishing a Wi-Fi connection. A provisioning eSIM 208 of the mobile wireless device 102 can be in the inactive state 404 when the option for a non-cellular wireless connection is presented and opted out of by the user of the mobile wireless device. As a result of no non-cellular wireless connection being available or established, and a network connection being required to continue with the device activation procedure, the mobile wireless device 102 can change the state of the provisioning eSIM 208 from the inactive state 404 to the active state 406. A limited functionality cellular wireless connection can be established using credentials of the provisioning eSIM 208, and the user is presented with an option to set up cellular wireless service for the mobile wireless device 102, such as transferal from another wireless device 102 or by scanning a quick response (QR) code provided by an MNO 114. After a fully functional user eSIM 208 is downloaded, installed, and enabled on the eUICC 108 of the mobile wireless device 102, the provisioning eSIM 208 can be no longer required (as the user eSIM 208 can provide cellular wireless connectivity). The mobile wireless device 102 can change the state of the provisioning eSIM 208 from the active state 406 to the disabled state 402. In some embodiments, the mobile wireless device 102 transitions the state of the provisioning eSIM 208 from the active state 406 to the inactive state 404 before further transitioning the provisioning eSIM 208 to the disabled state 402. In some embodiments, the mobile wireless device 102 disables the provisioning eSIM 208 by directly transitioning the provisioning eSIM 208 from the active state 406 to the disabled state 402. In some embodiments, the mobile wireless device 102 transitions the provisioning eSIM 208 from the active state 406 to the inactive state 404 when a user eSIM 208 is not successfully downloaded, installed, or enabled on the eUICC 108 of the mobile wireless device 102 to allow for subsequent use of the provisioning eSIM 208 for wireless connectivity if required and no other wireless connections are available.

Figure 6A:
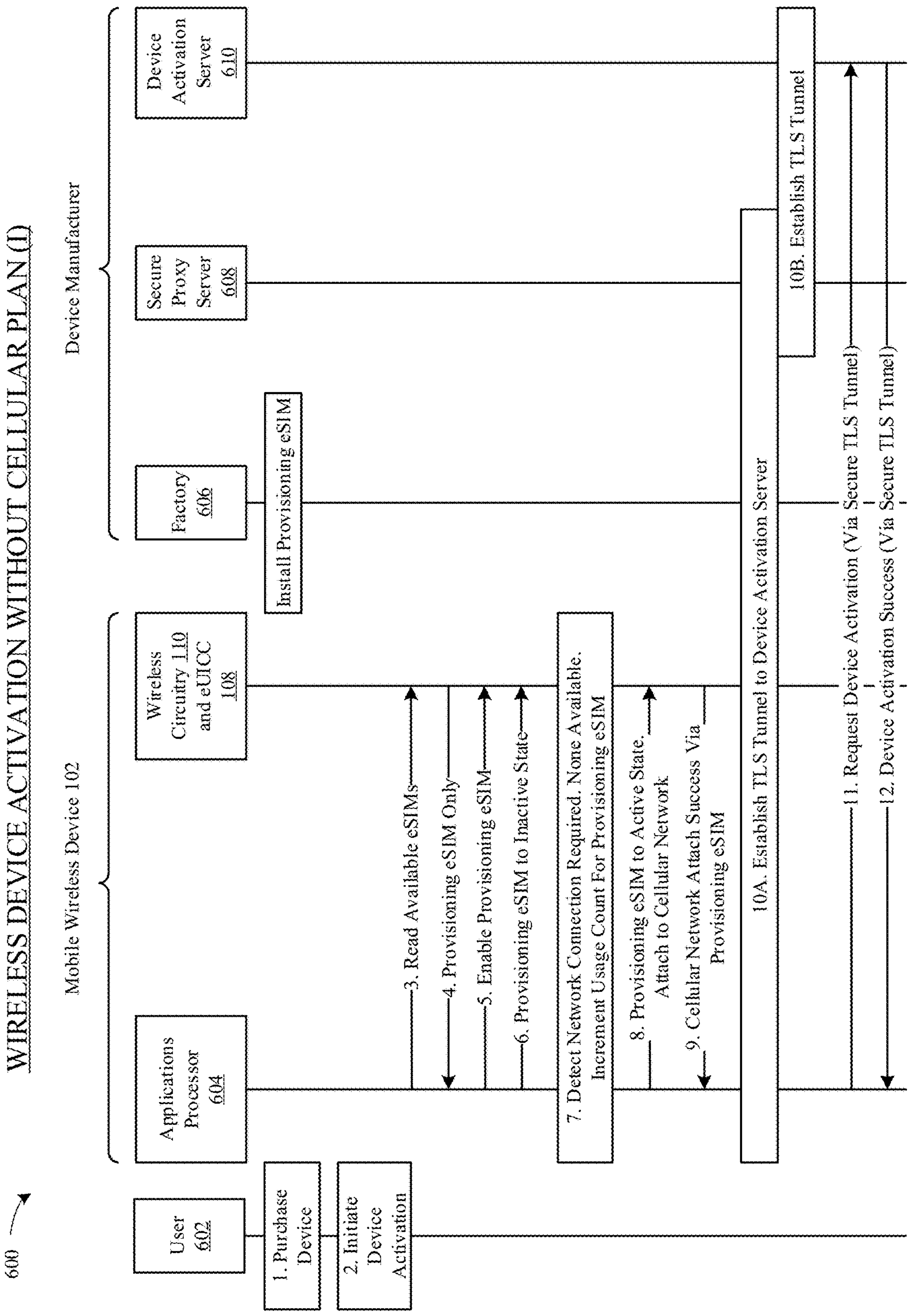
FIGS. 6A and 6B illustrate an exemplary wireless device activation flow with provisioning eSIM state changes for a wireless device without a cellular wireless service plan, according to some embodiments.
Figure 6B:
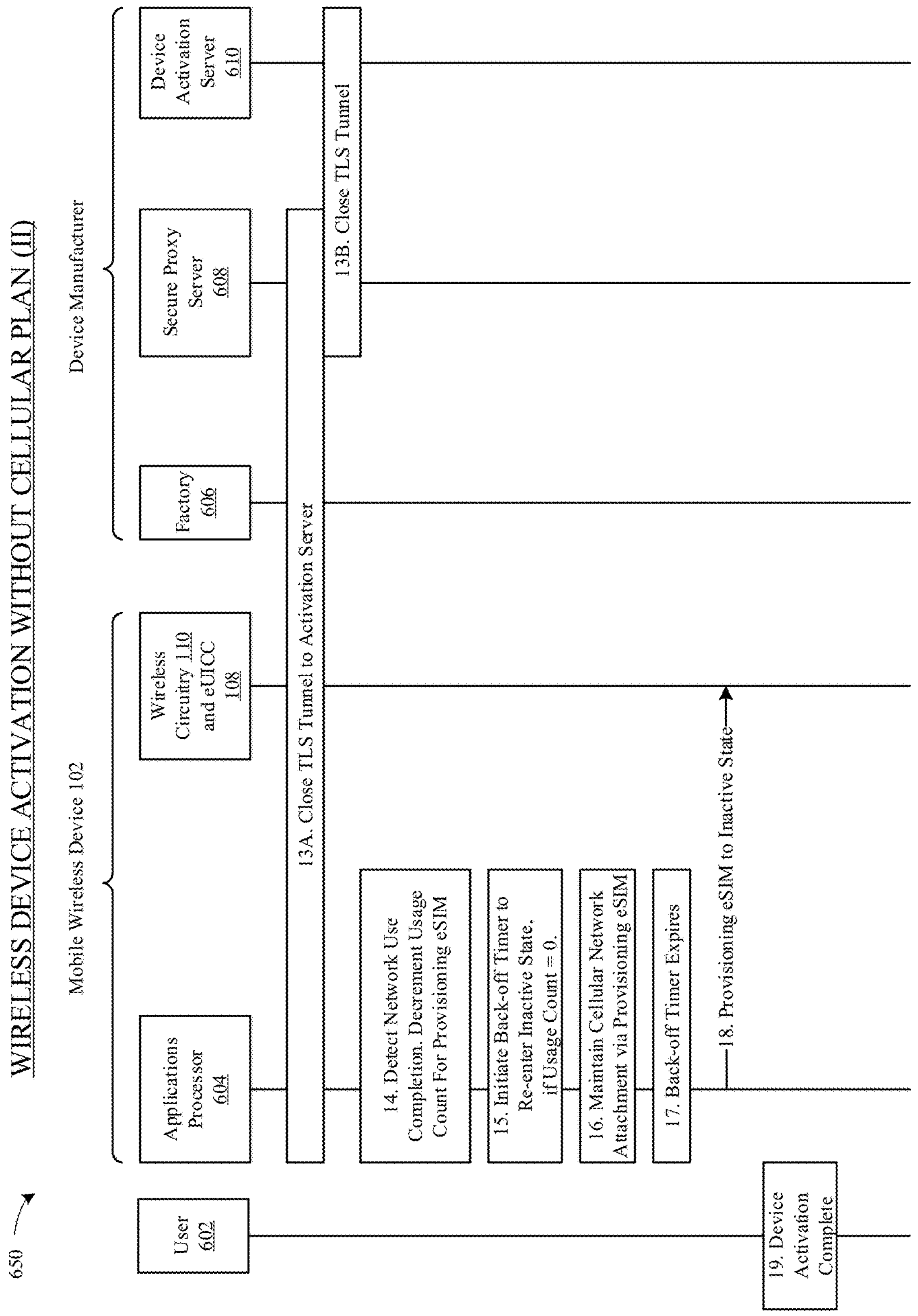
Figure 7A:
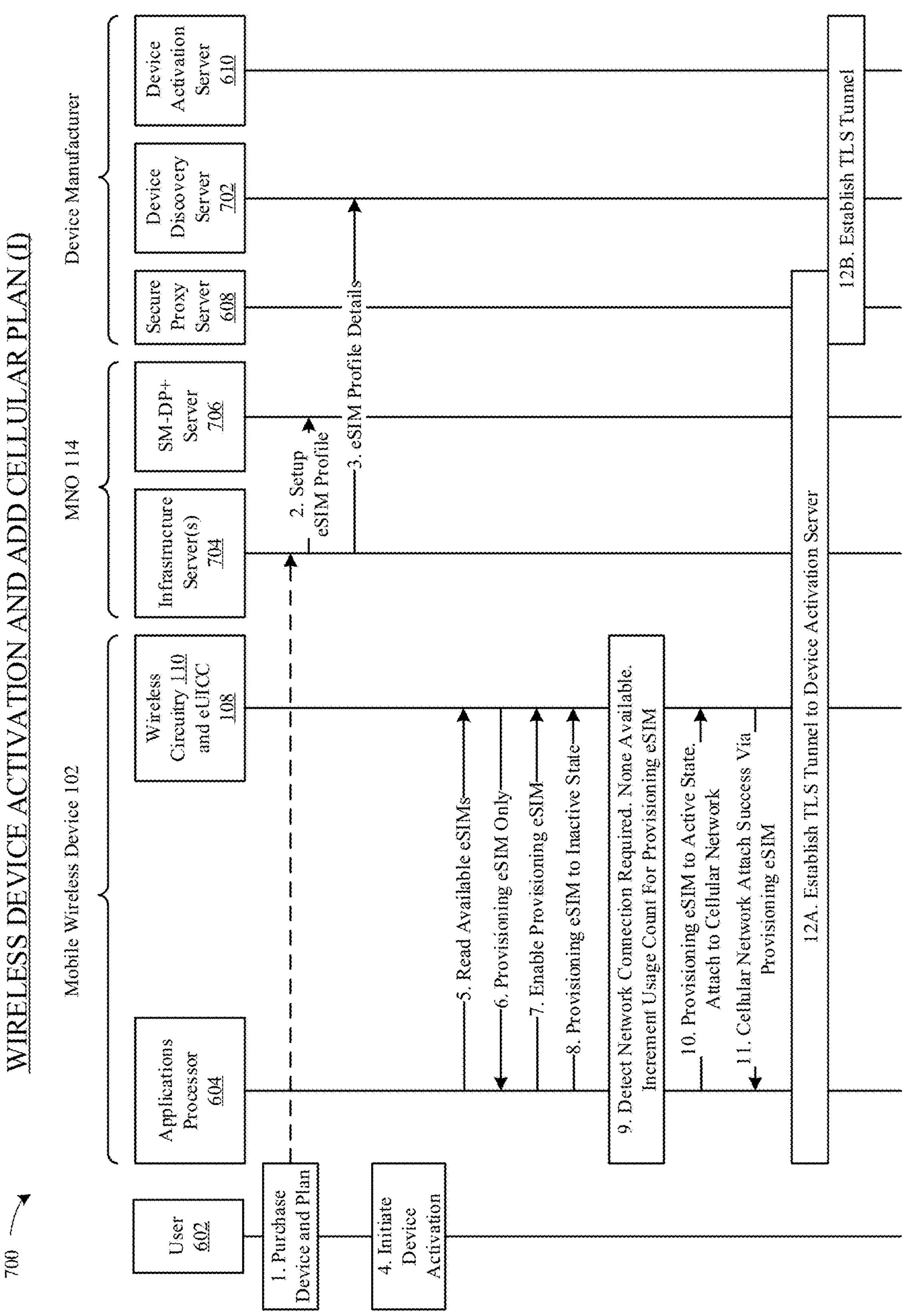
FIGS. 7A, 7B, 7C, 7D, and 7E illustrate an example of a wireless device activation and addition of a cellular wireless service plan to the wireless device with provisioning eSIM state changes, according to some embodiments.
Figure 7B:
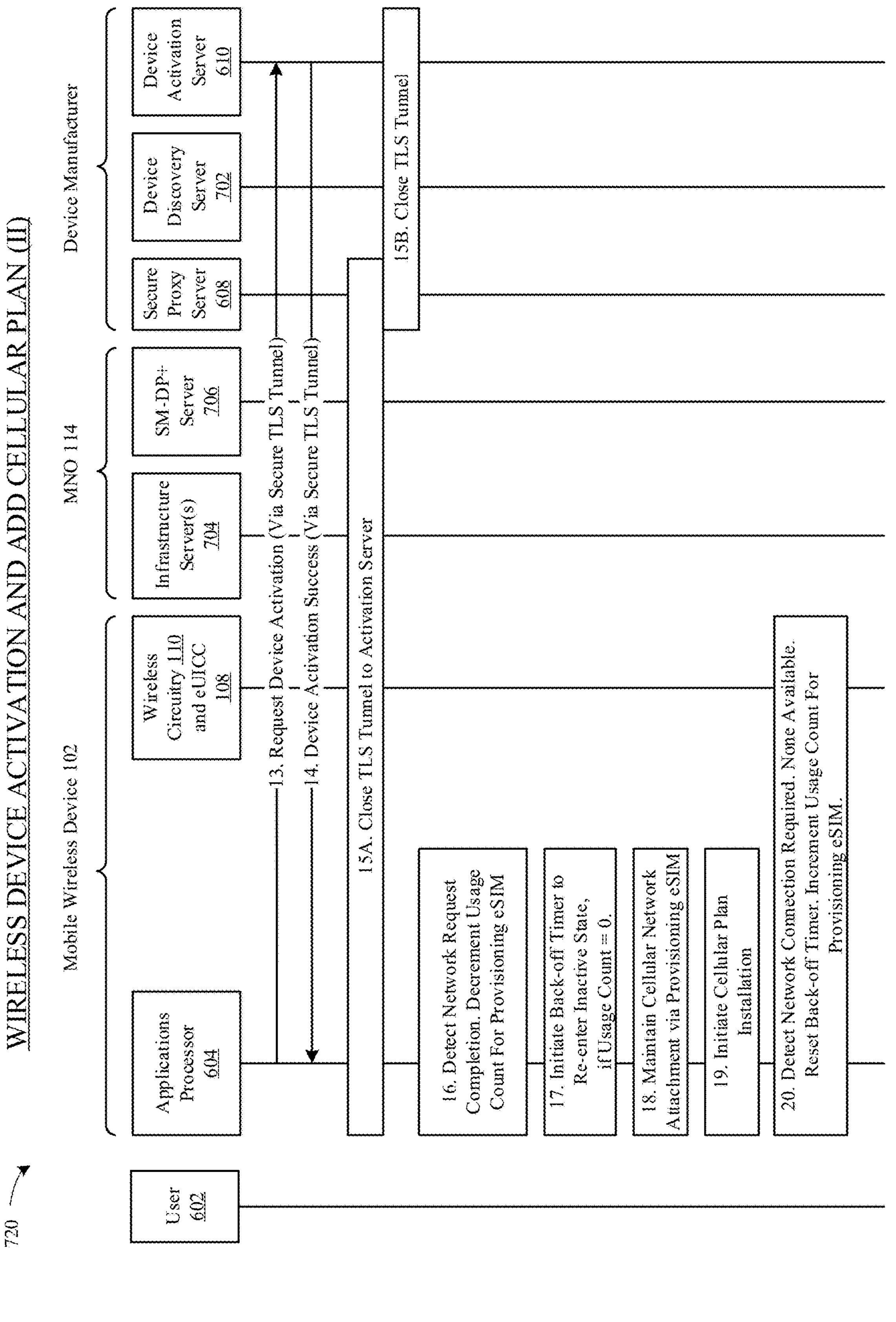
Figure 7C:
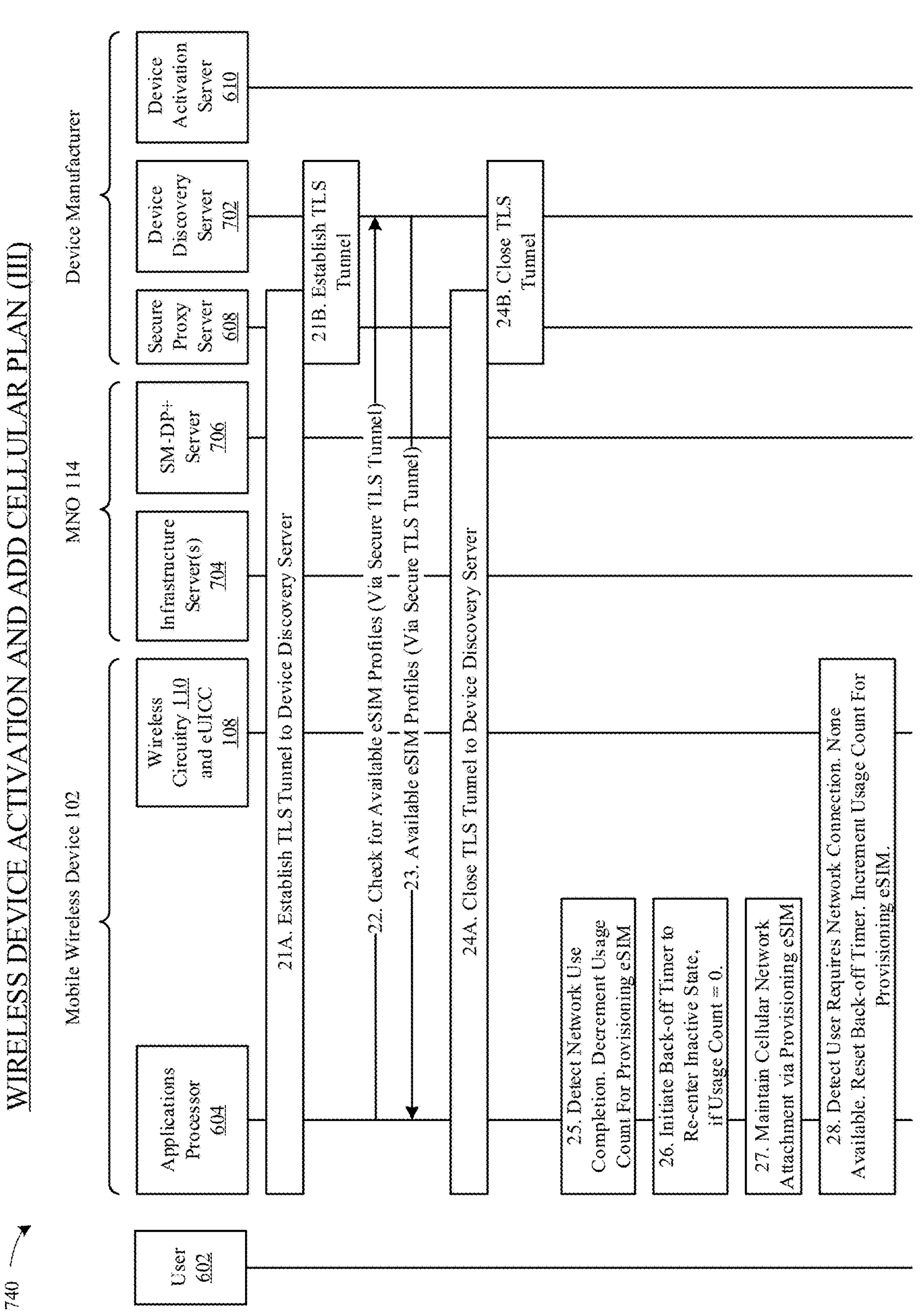
Figure 7D:
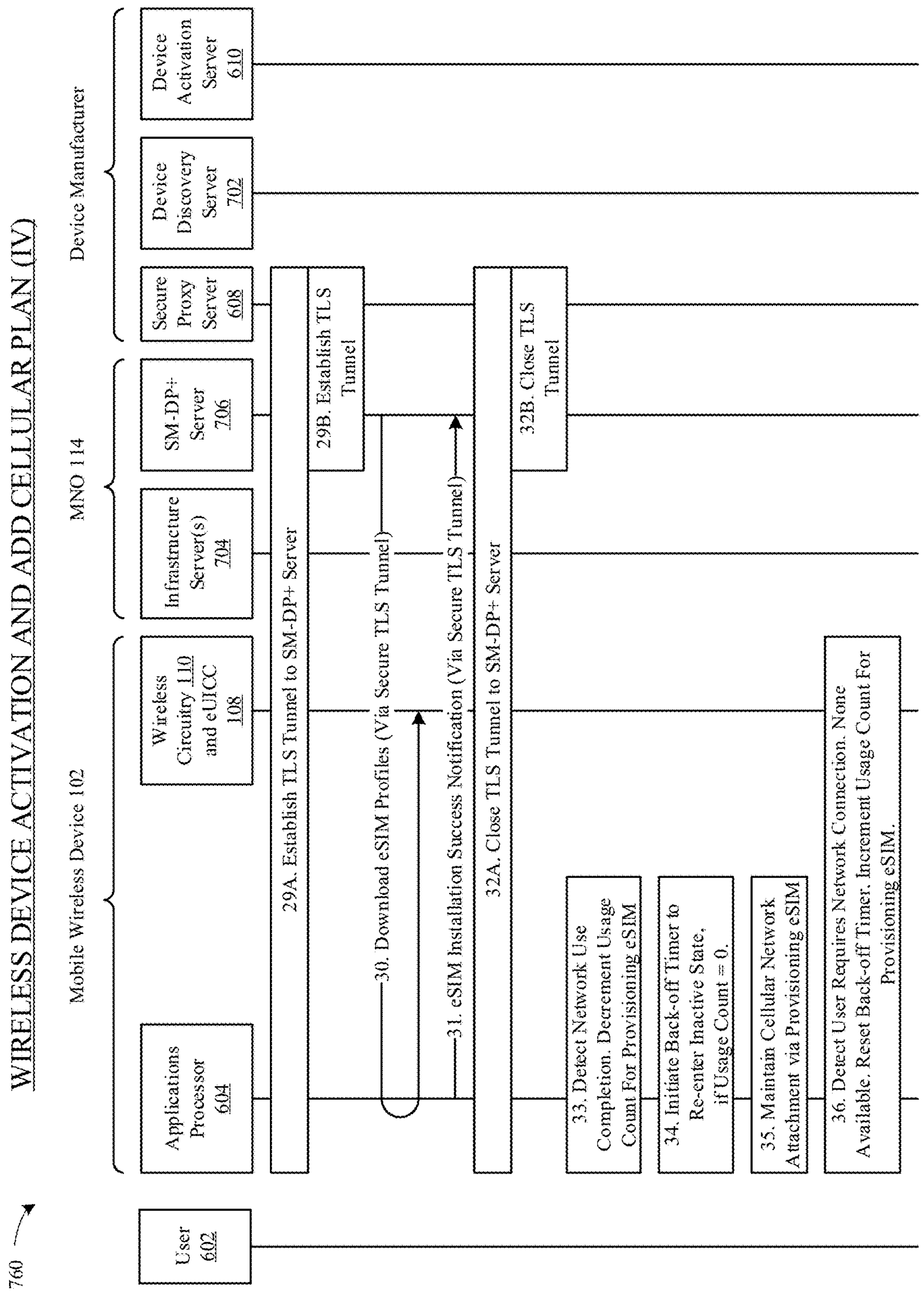
Figure 7E:
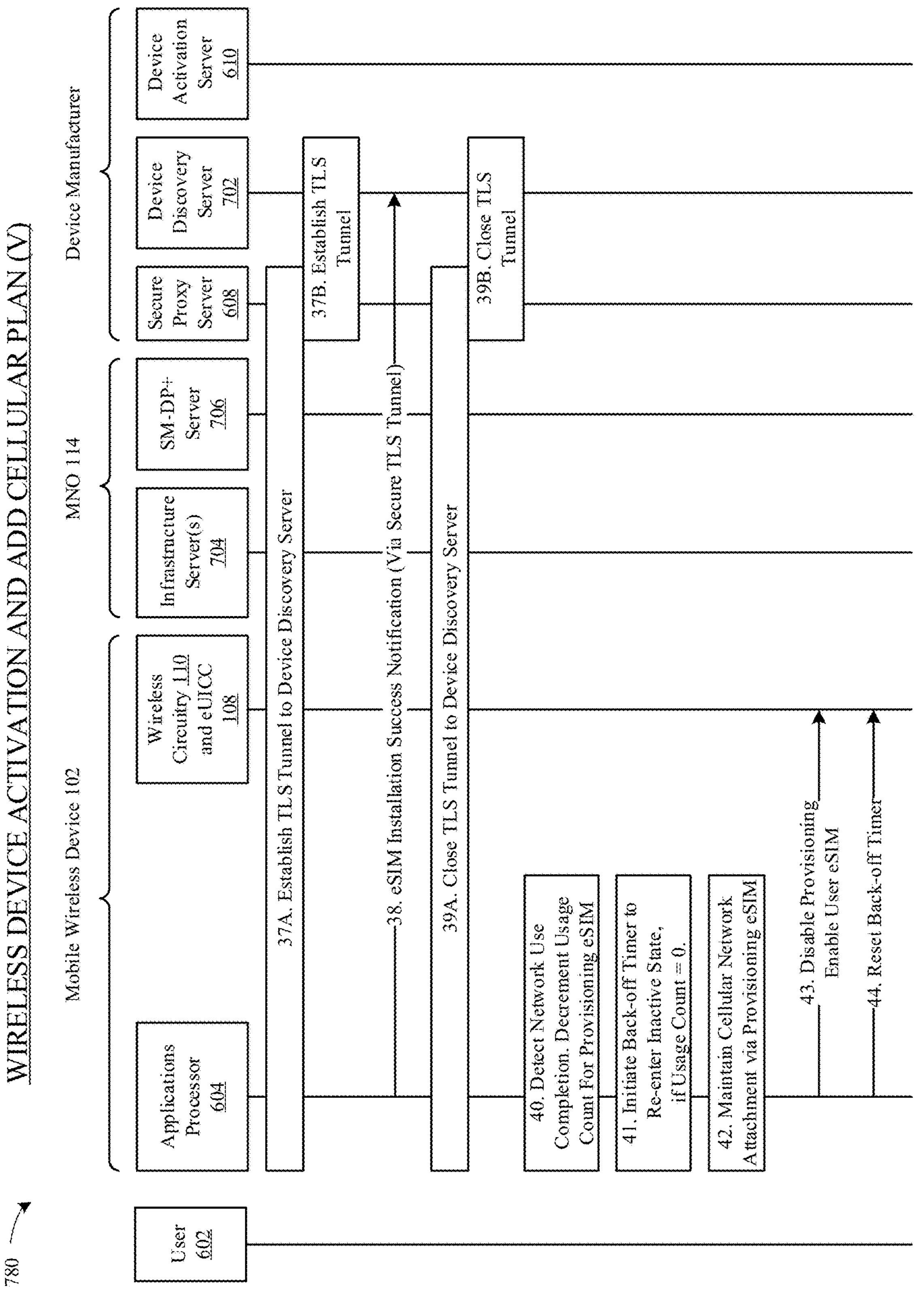

FIGS. 6A and 6B illustrate diagrams 600, 650 of an exemplary wireless device activation flow with provisioning eSIM 208 state changes for a mobile wireless device 102 without a cellular wireless service plan. Initially, the mobile wireless device 102 is manufactured with a provisioning eSIM 208 installed on an eUICC 108 of the mobile wireless device 102 at a factory 606 or downloaded to the eUICC 108 thereafter. A user 602 purchases the mobile wireless device 102 and initiates a device activation procedure, e.g., after unboxing and booting up the mobile wireless device 102. An applications processor 604 of the mobile wireless device 102 sends a message to the eUICC 108 to determine available eSIMs 208 on the eUICC 108. The eUICC 108 responds with an indication that the eUICC 108 is configured with a provisioning eSIM 208 only and without any installed or enabled user eSIMs 208. The provisioning eSIM 208 can be initially installed on the eUICC 108 in a disabled state 402. The applications processor 604 sends a message to the eUICC 108 to enable the provisioning eSIM 208 on the eUICC 108. The applications processor 604 then sends a message to the eUICC 108 to put the provisioning eSIM 208 in the inactive state 404. In some embodiments, the applications processor 604 sends a single message to enable and place the provisioning eSIM into the inactive state 404 from the disabled state 402. Subsequently, the applications processor 604 detects a specific requirement for a network connection, e.g., to connect to a device activation server 610 managed by a device manufacturer of the mobile wireless device 102 as part of the device activation procedure for the mobile wireless device 102. The applications processor 604 communicates with the wireless circuitry 110 to establish the required network connection. The applications processor 604 together with the wireless circuitry 110 can determine that no network connection, e.g., a non-cellular wireless connection or a user SIM/eSIM 208 wireless connection, is available. The applications processor 604 can increment a usage count for the provisioning eSIM 208 and send a message to the wireless circuitry 110 to transition the provisioning eSIM 208 on the eUICC 108 from the inactive state 404 to the active state 406. The wireless circuitry 110 can attach to an access portion of a cellular wireless network using credentials of the provisioning eSIM 208 and indicate to the applications processor 604 when successful attachment to the cellular wireless network using the provisioning eSIM 208 has occurred. The mobile wireless device 102 establishes a transport layer security (TLS) tunnel to the device activation server 610 via secure proxy server 608. Connecting via the secure proxy server 608 provides an additional level of security and privacy over a direct connection to the device activation server 610. The applications processor 604 then requests to activate the mobile wireless device 102 via the secure TLS tunnel and subsequently receives from the device activation server 610 an indication of successful device activation. The applications processor 604 then closes the secure TLS tunnel with the device activation server 610 after successful completion of the device activation. The applications processor 604 detects that the use of the network connection has completed and decrements a usage count for the provisioning eSIM 208. When a value of the usage count reaches a null value, e.g., when no other requirements for network connections are pending, the applications processor 604 initiates a back-off timer to wait for a back-off time period with the provisioning eSIM 208 in the active state 406. This back-off time period allows for detection of a subsequent requirement for a network connection and provides for hysteresis to avoid ping-ponging the state of the provisioning eSIM 208 between the active state 406 and the inactive state 404 during a series of distinct, non-overlapping requirements for network connections using the provisioning eSIM 208. The applications processor 604 (and wireless circuitry 110 of the mobile wireless device 102) maintains attachment to the cellular wireless network associated with the provisioning eSIM during the back-off time period. After the back-off timer expires, when no additional requirements for network connections have arrived, the applications processor 604 sends a message to the eUICC 108 to change the state of the provisioning eSIM 208 from the active state 406 to the inactive state 404. An indication of device activation completion can be subsequently provided, e.g., via a user interface of the mobile wireless device 102, to the user 602.

FIGS. 7A, 7B, 7C, 7D, and 7E illustrate diagrams 700, 720, 740, 760, 780 respectively of an example of activation of a mobile wireless device 102 including addition of a cellular wireless service plan to the mobile wireless device 102 with accompanying state changes for a provisioning eSIM 208 during a device activation with cellular plan provisioning procedure. Initially, the mobile wireless device 102 is manufactured with a provisioning eSIM 208 installed on an eUICC 108 of the mobile wireless device 102 at a factory 606 or downloaded to the eUICC 108 thereafter. A user 602 purchases the mobile wireless device 102 and subscribes to a cellular wireless service plan, which requires preparation by one or more network-based servers of an MNO 114 associated with the cellular wireless service plan, e.g., infrastructure server(s) 704 and SM-DP+ server 706, the latter which is a provisioning server 116. The infrastructure server (s) 704 initiate setup of an eSIM profile 208 associated with the cellular wireless service plan subscribed to by the user 602 on the SM-DP+ server 706 for subsequent download to the eUICC 108 of the mobile wireless device 102. The eSIM profile 208 can also be referred to as a user eSIM 208 and provide access to cellular wireless services of the MNO 114. The infrastructure server(s) 704 provide detailed information regarding the eSIM profile 208 to a device discovery server 702 managed by a device manufacturer of the mobile wireless device 102. Subsequently, the user 602 initiates a device activation procedure for the mobile wireless device 102, e.g., after unboxing and booting up the mobile wireless device 102.

An applications processor 604 of the mobile wireless device 102 sends a message to the eUICC 108 to determine available eSIMs 208 on the eUICC 108. The eUICC 108 responds with an indication that the eUICC 108 is configured with a provisioning eSIM 208 only and without any installed or enabled user eSIMs 208. The provisioning eSIM 208 can be initially installed on the eUICC 108 in a disabled state 402. The applications processor 604 sends a message to the eUICC 108 to enable the provisioning eSIM 208 on the eUICC 108. The applications processor 604 then sends a message to the eUICC 108 to put the provisioning eSIM 208 in the inactive state 404. In some embodiments, the applications processor 604 sends a single message to enable and place the provisioning eSIM into the inactive state 404 from the disabled state 402. Subsequently, the applications processor 604 detects a specific requirement for a network connection, e.g., to connect to a device activation server 610 managed by a device manufacturer of the mobile wireless device 102 as part of the device activation procedure for the mobile wireless device 102. The applications processor 604 communicates with the wireless circuitry 110 to establish the required network connection. The applications processor 604 together with the wireless circuitry 110 can determine that no network connection, e.g., a non-cellular wireless connection or a user SIM/eSIM 208 wireless connection, is available. The applications processor 604 can increment a usage count for the provisioning eSIM 208 and send a message to the wireless circuitry 110 to transition the provisioning eSIM 208 on the eUICC 108 from the inactive state 404 to the active state 406. The wireless circuitry 110 can attach to an access portion of a cellular wireless network using credentials of the provisioning eSIM 208 and indicate to the applications processor 604 when successful attachment to the cellular wireless network using the provisioning eSIM 208 has occurred. The mobile wireless device 102 establishes a transport layer security (TLS) tunnel to the device activation server 610 via secure proxy server 608. Connecting via the secure proxy server 608 provides an additional level of security and privacy over a direct connection to the device activation server 610. The applications processor 604 then requests to activate the mobile wireless device 102 via the secure TLS tunnel and subsequently receives from the device activation server 610 an indication of successful device activation. The applications processor 604 then closes the secure TLS tunnel with the device activation server 610 after successful completion of the device activation. The applications processor 604 detects that the use of the network connection has completed and decrements a usage count for the provisioning eSIM 208. When a value of the usage count reaches a null value, e.g., when no other requirements for network connections are pending, the applications processor 604 initiates a back-off timer to wait for a back-off time period with the provisioning eSIM 208 in the active state 406. This back-off time period allows for detection of a subsequent requirement for a network connection and provides for hysteresis to avoid ping-ponging the state of the provisioning eSIM 208 between the active state 406 and the inactive state 404 during a series of distinct, non-overlapping requirements for network connections using the provisioning eSIM 208. The applications processor 604 (and wireless circuitry 110 of the mobile wireless device 102) maintains attachment to the cellular wireless network associated with the provisioning eSIM during the back-off time period.

The applications processor 604 initiates installation of the cellular wireless service plan before expiration of the back-off timer resulting in a new requirement for a network connection by the mobile wireless device 102. The applications processor 604 detects a specific requirement for a network connection, e.g., to connect to the device discovery server 702 to determine available eSIM profiles 208 for the mobile wireless device 102 as part of the cellular wireless service plan installation procedure. The applications processor 604 communicates with the wireless circuitry 110 to establish the required network connection. The applications processor 604 together with the wireless circuitry 110 can determine that no network connection, e.g., a non-cellular wireless connection or a user SIM/eSIM 208 wireless connection, is available. The applications processor 604 can reset the back-off timer and increment a usage count for the provisioning eSIM 208. The applications processor 604 does not need to change the state of the provisioning eSIM 208, which has remained in the active state 406 with attachment to the cellular wireless network via the provisioning eSIM 208 while the back-off timer was running but had not expired before being reset due to the additional requirement for a network connection being detected. The mobile wireless device 102 establishes a transport layer security (TLS) tunnel to the device discovery server 702 via the secure proxy server 608. Connecting via the secure proxy server 608 provides an additional level of security and privacy over a direct connection to the device discovery server 702. The applications processor 604 queries the device discovery server 702 for available eSIM profiles 208 designated for the mobile wireless device 102 via the secure TLS tunnel and receives, in response from the device discovery server 702, an information regarding available eSIM profiles 208. The information can include a network address, e.g., a uniform resource locator (URL) or fully qualified domain name (FQDN) for the SM-DP+ server 706 from which to obtain the eSIM profiles 208 for the mobile wireless device 102. The applications processor 604 then closes the secure TLS tunnel with the device discovery server 702 after receiving the eSIM profile 208 information. The applications processor 604 detects that the use of the network connection has completed and decrements a usage count for the provisioning eSIM 208. If the value of the usage count has reached a null value, e.g., when no other requirements for network connections are pending, the applications processor 604 initiates the back-off timer to wait for a back-off time period with the provisioning eSIM 208 in the active state 406. The applications processor 604 (and wireless circuitry 110 of the mobile wireless device 102) maintains attachment to the cellular wireless network associated with the provisioning eSIM during the back-off time period.

The applications processor 604 detects a requirement for a new network connection, e.g., to continue the cellular service plan installation by obtaining the eSIM profile 208 from the SM-DP+ server 706. The applications processor 604 communicates with the wireless circuitry 110 to establish the required network connection. The applications processor 604 together with the wireless circuitry 110 can determine that no network connection, e.g., a non-cellular wireless connection or a user SIM/eSIM 208 wireless connection, is available. The applications processor 604 resets the back-off timer and increments a usage count for the provisioning eSIM 208. The applications processor 604 does not need to change the state of the provisioning eSIM 208, which has remained in the active state 406 with attachment to the cellular wireless network via the provisioning eSIM 208 while the back-off timer was running but had not expired before being reset due to the additional requirement for a network connection being detected. The mobile wireless device 102 establishes a transport layer security (TLS) tunnel to the SM-DP+ server 706 via the secure proxy server 608. Connecting via the secure proxy server 608 provides an additional level of security and privacy over a direct connection to the SM-DP+ server 706. The mobile wireless device 102 downloads one or more eSIM profiles 208 from the SM-DP+ server 706 to the eUICC 108 via the applications processor 604 using the secure TLS tunnel. The applications processor 604 sends a notification message to the SM-DP+ server 706 via the secure TLS tunnel indicating successful downloading and installation of the eSIM profiles 208 on the eUICC 108 of the mobile wireless device 102. The applications processor 604 then closes the secure TLS tunnel with the SM-DP+ server 706 after sending the successful eSIM installation notification message to the SM-DP+ server 706. The applications processor 604 detects that the use of the network connection has completed and decrements a usage count for the provisioning eSIM 208. If the value of the usage count has reached a null value, e.g., when no other requirements for network connections are pending, the applications processor 604 initiates the back-off timer to wait for a back-off time period with the provisioning eSIM 208 in the active state 406. The applications processor 604 (and wireless circuitry 110 of the mobile wireless device 102) maintains attachment to the cellular wireless network associated with the provisioning eSIM during the back-off time period.

The applications processor 604 detects a requirement for a new network connection, e.g., to complete the cellular service plan installation by acknowledging successful eSIM installation with the device discovery server 702. The applications processor 604 communicates with the wireless circuitry 110 to establish the required network connection. The applications processor 604 together with the wireless circuitry 110 can determine that no network connection, e.g., a non-cellular wireless connection or a user SIM/eSIM 208 wireless connection, is available. The applications processor 604 resets the back-off timer and increments a usage count for the provisioning eSIM 208. The applications processor 604 does not need to change the state of the provisioning eSIM 208, which has remained in the active state 406 with attachment to the cellular wireless network via the provisioning eSIM 208 while the back-off timer was running but had not expired before being reset due to the additional requirement for a network connection being detected. The mobile wireless device 102 establishes a transport layer security (TLS) tunnel to the device discovery server 702 via the secure proxy server 608. The applications processor 604 sends a notification message to the device discovery server 702 via the secure TLS tunnel indicating successful downloading and installation of the eSIM profiles 208 on the eUICC 108 of the mobile wireless device 102. The applications processor 604 then closes the secure TLS tunnel with the device discovery server 702 after sending the successful eSIM installation notification message to the device discovery server 702. The applications processor 604 detects that the use of the network connection has completed and decrements a usage count for the provisioning eSIM 208. If the value of the usage count has reached a null value, e.g., when no other requirements for network connections are pending, the applications processor 604 initiates the back-off timer to wait for a back-off time period with the provisioning eSIM 208 in the active state 406. The applications processor 604 (and wireless circuitry 110 of the mobile wireless device 102) maintains attachment to the cellular wireless network associated with the provisioning eSIM during the back-off time period.

After successful installation of one or more fully functional user eSIM profiles 208 on the mobile wireless device 102, the provisioning eSIM profile 208 can be no longer required, as at least one of the user eSIM profiles 208 should be usable to establish a cellular wireless network connection. The applications processor 604 sends a message to the eUICC 108 to disable the provisioning eSIM 208 changing the state of the provisioning eSIM 208 from the active state 406 to the disabled state 402. The applications processor 604 also resets the back-off timer, which is no longer required to monitor for network connections that require use of the provisioning eSIM 208. The provisioning eSIM 208 can remain on the eUICC 108 of the mobile wireless device 102 to be re-used if required at a future time, e.g., after a factory reset of the mobile wireless device 102 or when non-cellular wireless connections and cellular wireless connections using user eSIM profiles 208 are unavailable or unable to be established. The provisioning eSIM profile 208 could be used to download and install another user eSIM profile 208 or to communicate with one or more network-based servers of an MNO 114 or of a device manufacturer. The provisioning eSIM 208, however, can be restricted to a limited set of essential services and cannot be used for voice connections or unrestricted data connections.

Figure 8:
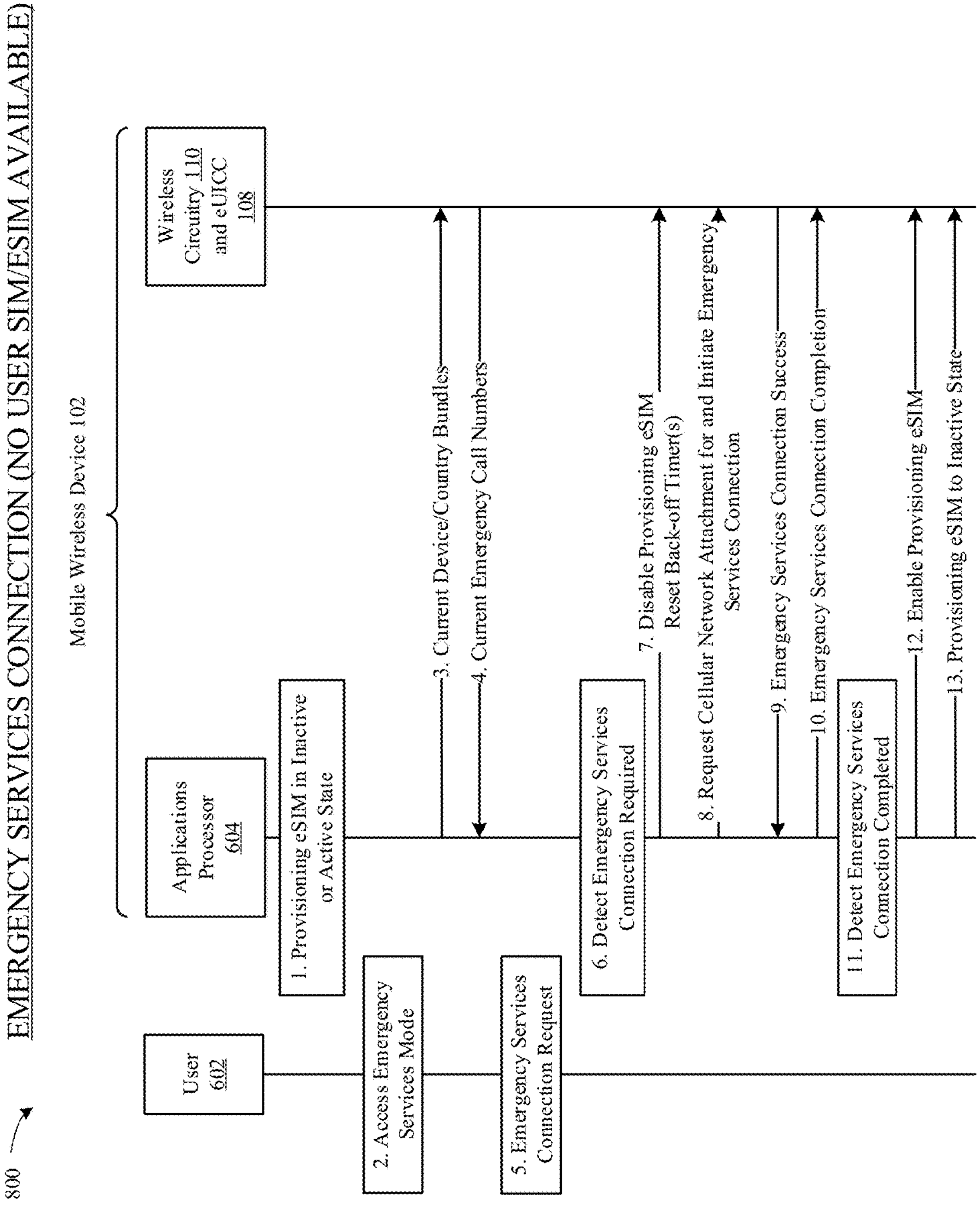
FIG. 8 illustrates an example of state changes for a provisioning eSIM to allow an emergency services connection, according to some embodiments.

FIG. 8 illustrates a diagram 800 of an example of state changes for a provisioning eSIM 208 to allow an emergency services connection to be established by a mobile wireless device 102. In some embodiments, the mobile wireless devices 102 does not include an available (installed and enabled) user SIM or eSIM 208 to use for the emergency services connection. In some embodiments, the mobile wireless device 102 includes no user SIMs or eSIM 208 installed therein. A provisioning eSIM 208 is installed on the eUICC 108 of the mobile wireless device 102 and can be initially in an inactive state 404 or in an active state 406. The provisioning eSIM profile 208 can be restricted to use for limited functionality data connections only and can be unable to be used for voice connections by the mobile wireless device 102. A user 602 can access an emergency services mode of the mobile wireless device 102, e.g., by selecting an emergency services icon via a user interface display or performing an action indicating a requirement for access to the emergency services mode. The applications processor 604 can provide a set of current device/country bundles to wireless circuitry 110 and/or the eUICC 108 of the mobile wireless device 102. The wireless circuitry 110 and/or the eUICC 108 of the mobile wireless device 102 can return a set of current, applicable emergency call numbers that can be used at a current location of the mobile wireless device 102. The applications processor 604 can detect that an emergency services connection is required, e.g., to connect to a police station, a fire station, a hospital, an emergency dispatch center, or the like. As the provisioning eSIM 208 is currently in the inactive state 404 or in the active state 406 and cannot be used to provide the requested emergency services connection, the applications processor 604 sends a message to the wireless circuitry 110 and/or the eUICC 108 of the mobile wireless device 102 to disable the provisioning eSIM 208, causing the state of the provisioning eSIM 208 to change from the inactive state or the active state 406 to the disabled state 402. Any running back-off timers can also be reset. The applications processor 604 can then send to the wireless circuitry 110 a request to attach to a cellular wireless network and initiate an emergency services connection via the cellular wireless network. The wireless circuitry 110 can establish the emergency services connection with the cellular wireless network without using credentials of the provisioning eSIM 208 or of any other SIM or eSIM 208 of the mobile wireless device 102. The wireless circuitry 110 can confirm to the applications processor 604 when the emergency services connection is successfully established. Subsequently, the emergency services connection can be no longer required, and the applications processor 604 send a message to the wireless circuitry 110 to terminate (complete) the emergency services connection with the cellular wireless network. The applications processor 604 can detect successful completion of the emergency services connection and can send a message to the wireless circuitry 110 and eUICC 108 to re-enable the provisioning eSIM 208 and then to transition the provisioning eSIM 208 state from the disabled state 402 to the inactive state 404. To allow for the emergency services connection with the cellular wireless network to be established the provisioning eSIM 208 is disabled, and when an emergency services connection with the cellular wireless network is no longer required, the provisioning eSIM 208 is re-enabled and put into the inactive state 404 to allow for ready use when required later to attach and connect to a cellular wireless network using the credentials of the provisioning eSIM 208.

Figure 9:
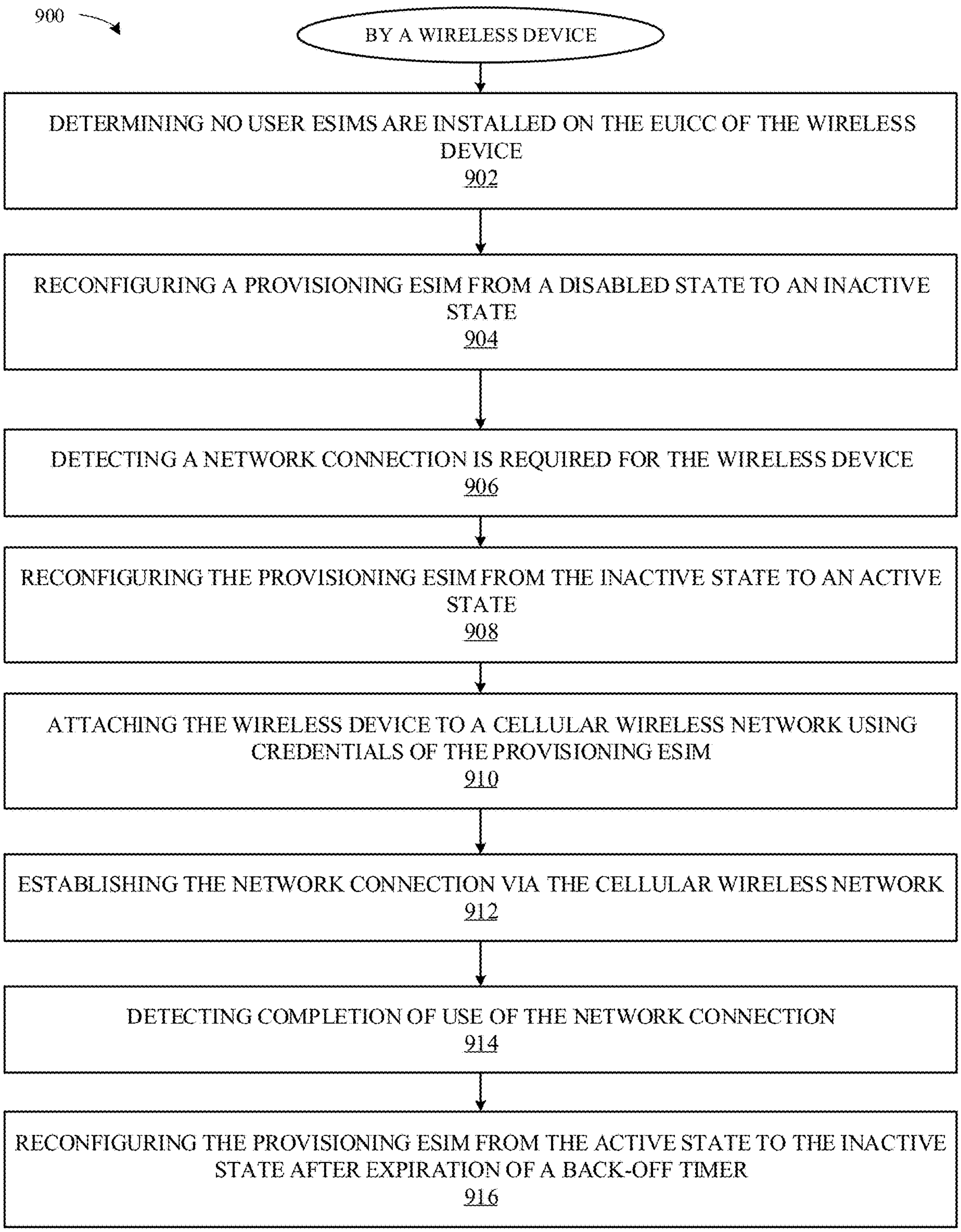
FIG. 9 illustrates an exemplary method for dynamic management of a provisioning eSIM installed on an eUICC of a wireless device, according to some embodiments.

FIG. 9 illustrates a flowchart 900 of an exemplary method for dynamic management of a provisioning eSIM 208 installed on an eUICC 108 of a wireless device 102. At 902, the wireless device 102 determines no user eSIMs 208 are installed on the eUICC 108 of the wireless device 102. At 904, the wireless device 102 reconfigures the provisioning eSIM 208 from a disabled state 402 to an inactive state 404. At 906, the wireless device 102 detects a network connection is required for the wireless device 102. At 908, the wireless device 102 reconfigures the provisioning eSIM 208 from the inactive state 404 to an active state 406. At 910, the wireless device 102 attaches to a cellular wireless network using credentials of the provisioning eSIM 208. At 912, the wireless device 102 establishes the required network connection via the cellular wireless network. At 914, the wireless device 102 detects completion of use of the network connection. At 916, the wireless device 102 reconfigures the provisioning eSIM 208 from the active state 406 to the inactive state 404 after expiration of a back-off timer. The provisioning eSIM 208, while in the inactive state 404, is enabled and restricted from being used to attach the wireless device 102 to the cellular wireless network.

In some embodiments, the method further includes the wireless device 102 determining no non-cellular wireless connection is available for the required network connection prior to reconfiguring the provisioning eSIM 208 from the inactive state 404 to the active state 406. In some embodiments, the method further includes the wireless device 102: i) incrementing a usage count for the provisioning eSIM 208 before reconfiguring the provisioning eSIM 208 to the active state 406, and ii) decrementing the usage count for the provisioning eSIM 208 after detection completion of the use of the network connection. In some embodiments, the method further includes the wireless device 102 initiating the back-off timer responsive to the usage count equaling a null value. In some embodiments, the method further includes the wireless device 102 maintaining attachment to the cellular wireless network via the credentials of the provisioning eSIM 208 after initiation and until expiration of the back-off timer. In some embodiments, the wireless device 102 determines no user eSIMs 208 are installed on the eUICC 108 by at least: i) querying the eUICC 108 for available user eSIMs 208, and ii) receiving an indication from the eUICC 108 indicating the provisioning eSIM 208 is the only eSIM 208 installed on the eUICC 108. In some embodiments, the network connection includes a transport layer security (TLS) tunneled connection via a secure proxy server. In some embodiments, the wireless device detects completion of use of the network connection by at least detecting closure of the TLS tunneled connection.

In some embodiments, the network connection is required for the wireless device 102 for device activation, and the method further includes the wireless device 102: i) requesting activation of the wireless device 102 via the TLS tunneled connection to a device activation server 610 managed by a device manufacturer of the wireless device 102, and ii) receiving an indication of successful device activation from the device activation server 610 via the TLS tunneled connection. In some embodiments, the network connection is required for the wireless device 102 to determine available user eSIMs 208, and the method further includes the wireless device 102: i) checking for available user eSIMs 208 via the TLS tunneled connection to a device discovery server 702 managed by a device manufacturer of the wireless device 102, and ii) receiving an indication of the available user eSIMs 208 from the device discovery server 702 via the TLS tunneled connection. In some embodiments, the network connection is required for the wireless device 102 to download a user eSIM 208, and the method further includes the wireless device 102: i) downloading the user eSIM 208 via the TLS tunneled connection from a provisioning server 116 managed by a mobile network operator (MNO) 114 associated with the user eSIM 208, and ii) providing an indication of successful user eSIM 208 installation to the provisioning server 116 via the TLS tunneled connection. In some embodiments, the method further includes the wireless device: i) disabling the provisioning eSIM 208 after successful installation of the user eSIM 208, and ii) enabling the user eSIM 208 on the eUICC 108 of the wireless device 102, where the provisioning eSIM 208 provides limited cellular wireless network connectivity restricted to certain endpoints, and the user eSIM 208 provides full cellular wireless network connectivity based on a cellular wireless subscription associated with the user eSIM 208 to access services of the MNO 114.

Figure 10:
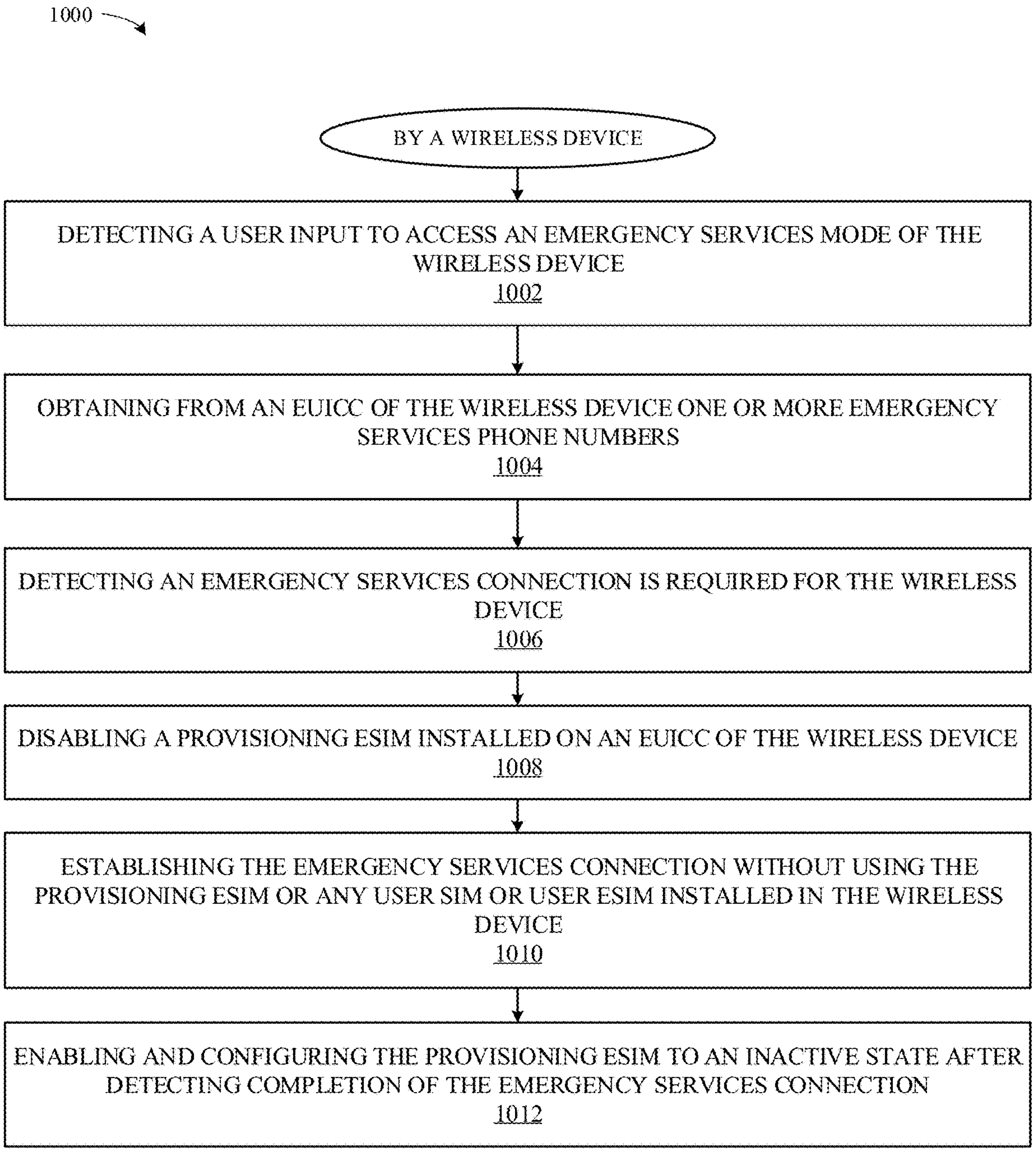
FIG. 10 illustrates an exemplary method for dynamic management of a provisioning eSIM for an emergency services connection, according to some embodiments.

FIG. 10 illustrates a flowchart 1000 of exemplary method for dynamic management of a provisioning eSIM 208, installed on an eUICC 108 of a wireless device 102, to allow an emergency services connection by the wireless device 102. At 1002, the wireless device 102 detects a user input to access an emergency services mode of the wireless device 102. At 1004, the wireless device 102 obtaining from the eUICC one or more emergency services phone numbers. At 1006, the wireless device 102 detects an emergency services connection is required for the wireless device 102. At 1008, the wireless device 102 disables the provisioning eSIM 208 installed on the eUICC 108 of the wireless device 102. At 1010, the wireless device 102 establishes the emergency services connection without using the provisioning eSIM 208 or any user SIM or user eSIM 208 installed in the wireless device 102. At 1012, the wireless device 102 enables and configures the provisioning eSIM 208 to an inactive state after detecting completion of the emergency services connection. In some embodiments, the wireless device 102 is configured without any enabled user SIM or user eSIM 208. In some embodiments, the provisioning eSIM 208, while in the inactive state, is enabled and restricted from being used to attach the wireless device 102 to a cellular wireless network.

Representative Device

Figure 11:
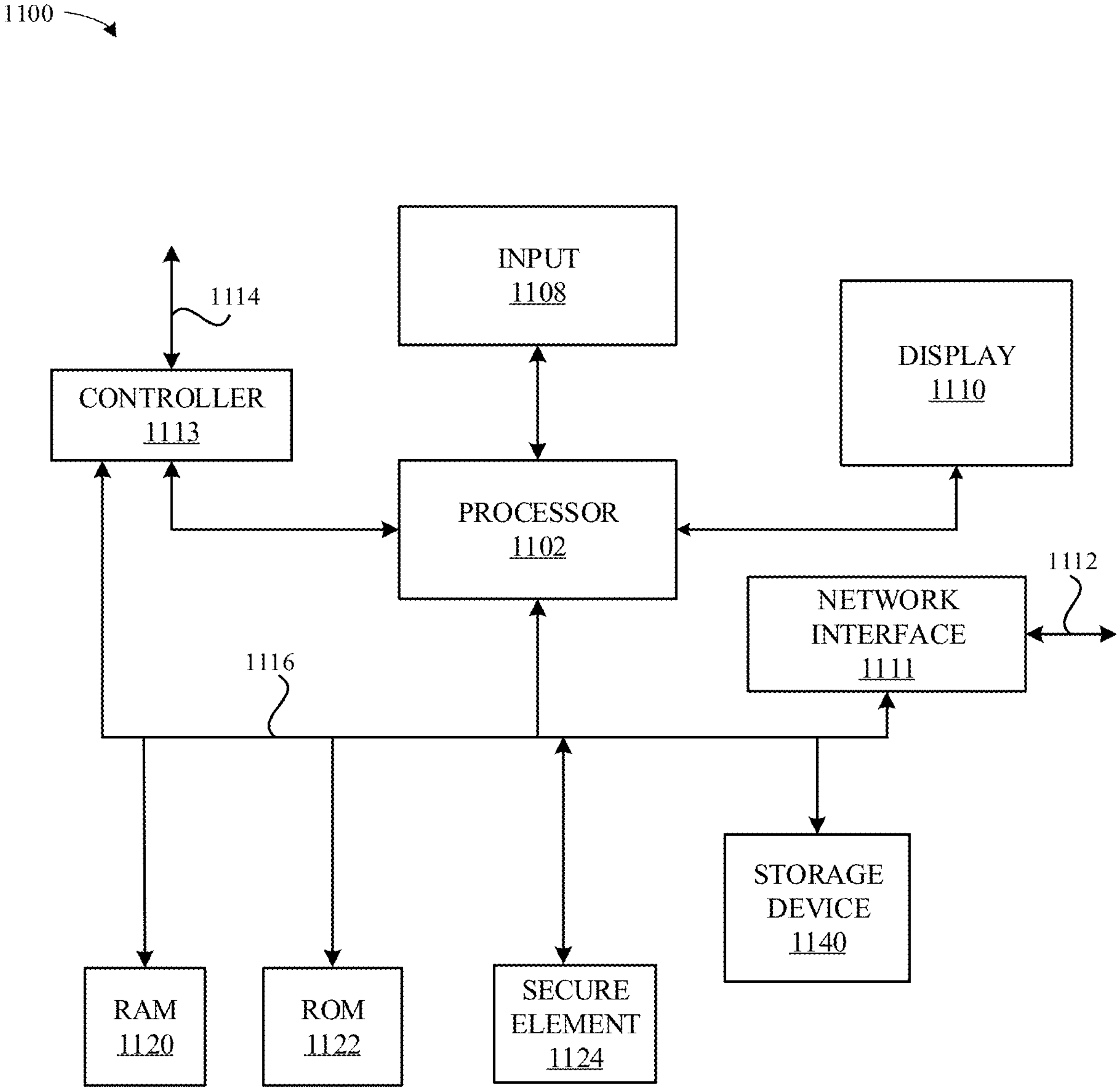
FIG. 11 illustrates a block diagram of exemplary elements of a wireless device, according to some embodiments.

FIG. 11 illustrates a detailed view of a representative computing device 1100 that can be used to implement various methods described herein, according to some embodiments. In particular, the detailed view illustrates various components that can be included in the mobile wireless device 102. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 that can be controlled by the processor 1102 to display information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that communicatively couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1124, which can represent secure storage for cellular wireless system access by the mobile wireless device 102, such as an eUICC 108 on which to store one or more eSIMs 208 and/or a UICC 118 on which to store a pSIM profile.

Wireless Terminology

In accordance with various embodiments described herein, the terms "wireless communication device," "wireless device," "mobile wireless device," "mobile station,"

and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic management of a provisioning electronic subscriber identity module (eSIM) installed on an embedded universal integrated circuit card (eUICC) of a wireless device, the method comprising:

by the wireless device:

determining no user eSIMs are installed on the eUICC;

reconfiguring the provisioning eSIM from a disabled state to an inactive state;

detecting a network connection is required for the wireless device;

reconfiguring the provisioning eSIM from the inactive state to an active state;

attaching the wireless device to a cellular wireless network using credentials of the provisioning eSIM;

establishing the network connection via the cellular wireless network;

detecting completion of use of the network connection; and reconfiguring the provisioning eSIM from the active state to the inactive state after expiration of a back-off timer, wherein:

the provisioning eSIM, while in the inactive state, is enabled and restricted from being used to attach the wireless device to the cellular wireless network;

the network connection comprises a transport layer security (TLS) tunneled connection via a secure proxy server; and the wireless device is configured to perform via the TLS tunneled connection one or more of: i) activation of the wireless device, ii) check for available user eSIMs, or iji) download a user eSIM.

2. The method of claim 1, further comprising:

by the wireless device:

determining no non-cellular wireless connection is available prior to reconfiguring the provisioning eSIM from the inactive state to the active state.

3. The method of claim 1, further comprising:

by the wireless device:

incrementing a usage count for the provisioning eSIM before reconfiguring the provisioning eSIM to the active state; and decrementing the usage count for the provisioning eSIM after detection completion of the use of the network connection.

4. The method of claim 3, further comprising:

by the wireless device:

initiating the back-off timer responsive to the usage count equaling a null value.

5. The method of claim 3, further comprising:

by the wireless device:

maintaining attachment to the cellular wireless network via the credentials of the provisioning eSIM after initiation and until expiration of the back-off timer.

6. The method of claim 1, wherein determining no user eSIMs are installed on the eUICC comprises:

querying the eUICC for available user eSIMs; and receiving an indication from the eUICC indicating the provisioning eSIM is the only eSIM installed on the eUICC.

7. The method of claim 1, wherein detecting completion of use of the network connection comprises detecting closure of the TLS tunneled connection.

8. The method of claim 1, wherein:

the network connection is required for the wireless device for device activation; and the method further comprises the wireless device:

requesting activation of the wireless device via the TLS tunneled connection to a device activation server managed by a device manufacturer of the wireless device; and receiving an indication of successful device activation from the device activation server via the TLS tunneled connection.

9. The method of claim 1, wherein:

the network connection is required for the wireless device to determine available user eSIMs; and the method further comprises the wireless device:

checking for available user eSIMs via the TLS tunneled connection to a device discovery server managed by a device manufacturer of the wireless device; and receiving an indication of the available user eSIMs from the device discovery server via the TLS tunneled connection.

10. The method of claim 1, wherein:

the network connection is required for the wireless device to download a user eSIM; and the method further comprises the wireless device:

downloading the user eSIM via the TLS tunneled connection from a provisioning server managed by a mobile network operator (MNO) associated with the user eSIM; and providing an indication of successful user eSIM installation to the provisioning server via the TLS tunneled connection.

11. The method of claim 10, further comprising:

by the wireless device:

disabling the provisioning eSIM after successful installation of the user eSIM; and enabling the user eSIM on the eUICC of the wireless device, wherein:

the provisioning eSIM provides limited cellular wireless network connectivity restricted to certain endpoints; and the user eSIM provides full cellular wireless network connectivity based on a cellular wireless subscription associated with the user eSIM to access services of the MNO.

12. A wireless device comprising:

wireless circuitry comprising one or more antennas and an embedded universal integrated circuit card (eUICC); and one or more processors communicatively coupled to the wireless circuitry and to a memory storing instructions that, when executed by the one or more processors, configure the wireless device to:

determine no user electronic subscriber identity modules (eSIMs) are installed on the eUICC;

reconfigure a provisioning eSIM on the eUICC from a disabled state to an inactive state;

detect a network connection is required for the wireless device;

reconfigure the provisioning eSIM from the inactive state to an active state;

attach the wireless device to a cellular wireless network using credentials of the provisioning eSIM;

establish the network connection via the cellular wireless network;

detect completion of use of the network connection; and reconfigure the provisioning eSIM from the active state to the inactive state after expiration of a back-off timer, wherein:

the provisioning eSIM, while in the inactive state, is enabled and restricted from being used to attach the wireless device to the cellular wireless network;

the network connection comprises a transport layer security (TLS) tunneled connection via a secure proxy server; and the wireless device is configured to perform via the TLS tunneled connection one or more of: i) activation of the wireless device, ii) check for available user eSIMs, or iii) download a user eSIM.

13. The wireless device of claim 12, wherein determination by the wireless device that no user eSIMs are installed on the eUICC comprises:

querying the eUICC for available user eSIMs; and receiving an indication from the eUICC indicating the provisioning eSIM is the only eSIM installed on the eUICC.

14. The wireless device of claim 12, wherein:

the network connection is required for the wireless device for device activation; and the wireless device is further configured to:

request activation of the wireless device via the TLS tunneled connection to a device activation server managed by a device manufacturer of the wireless device; and receive an indication of successful device activation from the device activation server via the TLS tunneled connection.

15. The wireless device of claim 12, wherein:

the network connection is required for the wireless device to determine available user eSIMs; and the wireless device is further configured to:

check for available user eSIMs via the TLS tunneled connection to a device discovery server managed by a device manufacturer of the wireless device; and receive an indication of the available user eSIMs from the device discovery server via the TLS tunneled connection.

16. The wireless device of claim 12, wherein:
the network connection is required for the wireless device to download a user eSIM; and
the wireless device is further configured to:
download the user eSIM via the TLS tunneled connection from a provisioning server managed by a mobile network operator (MNO) associated with the user eSIM; and
provide an indication of successful user eSIM installation to the provisioning server via the TLS tunneled connection.

17. The wireless device of claim 16, wherein the wireless device is further configured to:
disable the provisioning eSIM after successful installation of the user eSIM; and
enable the user eSIM on the eUICC of the wireless device, wherein:
the provisioning eSIM provides limited cellular wireless network connectivity restricted to certain endpoints; and
the user eSIM provides full cellular wireless network connectivity based on a cellular wireless subscription associated with the user eSIM to access services of the MNO.

18. An apparatus comprising memory communicatively coupled to one or more processors, the memory storing instructions to configure the one or more processors to:
determine no user electronic subscriber identity modules (eSIMs) are installed on an embedded universal integrated circuit card (eUICC);
reconfigure a provisioning eSIM on the eUICC from a disabled state to an inactive state;
detect a network connection is required;
reconfigure the provisioning eSIM from the inactive state to an active state;
attach to a cellular wireless network using credentials of the provisioning eSIM;
establish the network connection via the cellular wireless network;
detect completion of use of the network connection; and
reconfigure the provisioning eSIM from the active state to the inactive state after expiration of a back-off timer, wherein:
the provisioning eSIM, while in the inactive state, is enabled and restricted from being used to attach to the cellular wireless network;
the network connection comprises a transport layer security (TLS) tunneled connection via a secure proxy server; and
the one or more processors are configured to perform via the TLS tunneled connection one or more of: i) activation of a wireless device, ii) check for available user eSIMs, or iji) download a user eSIM.

19. The apparatus of claim 18, wherein the one or more processors are further configured to determine no non-cellular wireless connection is available prior to reconfiguring the provisioning eSIM from the inactive state to the active state.

20. The apparatus of claim 18, wherein the one or more processors are configured to determine no user eSIMs are installed on the eUICC by at least:
querying the eUICC for available user eSIMs; and
receiving an indication from the eUICC indicating the provisioning eSIM is the only eSIM installed on the eUICC.

* * * * *